US005535182A

United States Patent [19]

Itoi

[11] Patent Number: 5,535,182

[45] Date of Patent: Jul. 9, 1996

[54] OPTICAL DISK APPARATUS AND RECORDING/REPRODUCTION METHOD THEREFOR

[75] Inventor: Satoshi Itoi, Tokyo, Japan

[73] Assignee: NEC Corporation, Japan

[21] Appl. No.: 334,272

[22] Filed: Nov. 4, 1994

[30] Foreign Application Priority Data

Nov. 4, 1993 [JP] Japan .................................... 5-275325
Dec. 28, 1993 [JP] Japan .................................... 5-333945

[51] Int. Cl.$^{6}$ ........................................ G11B 7/00

[52] U.S. Cl. .......................... 369/32; 369/275.3; 369/47; 369/93

[58] Field of Search ................................ 369/32, 47, 48, 369/54, 275.3, 93, 58, 44.37, 124; 360/75, 77.02, 78.04

[56] References Cited

U.S. PATENT DOCUMENTS

| | | | |
|---|---|---|---|
| 4,750,059 | 6/1988 | Syracuse | 369/48 |
| 4,873,679 | 10/1989 | Murai et al. | 369/32 |
| 4,918,677 | 4/1990 | Ashinuma et al. | 369/32 |
| 5,210,733 | 5/1993 | Yamaguchi et al. | 369/32 |
| 5,255,261 | 10/1993 | Iida et al. | 369/275.3 |
| 5,315,568 | 5/1994 | Dente et al. | 369/32 |
| 5,345,435 | 9/1994 | Yamasaki | 369/275.3 |
| 5,412,629 | 5/1995 | Shirane | 369/32 |

FOREIGN PATENT DOCUMENTS

| | | |
|---|---|---|
| 63-161532 | 7/1988 | Japan . |

*Primary Examiner*—Georgia Y. Epps
*Assistant Examiner*—Tan Dinh
*Attorney, Agent, or Firm*—Ostrolenk, Faber, Gerb & Soffen

[57] ABSTRACT

An optical disk apparatus includes an optical storage medium, an optical head, a head drive section, and a recording data processor. The optical storage medium is rotated at a constant angular velocity. The optical storage medium has a storage area constituted by track areas ranging from the 0th area on the innermost periphery to the nth area on the outermost periphery of the storage area. The track areas are set by dividing the storage area into (n+1) equal areas (n is an integer satisfying n (≧1) in the radial direction. The optical head optically records and reproduces recording data on and from the optical storage medium with a constant wave length. The head drive section drives/controls the optical head. The recording data processor generates recording data such that the data amount is increased by ΔA (A is the amount of recording data per track when the optical head is located in the 0th track area) every time the optical head moves to the next track area, and outputs the recording data to the optical head. The recording data amount A and the increase ΔA are set such that the ratio between a track diameter in the mth track area (m is an integer satisfying n≧m≧0) and a recording data amount (A+ΔA×m) is made substantially constant.

15 Claims, 11 Drawing Sheets

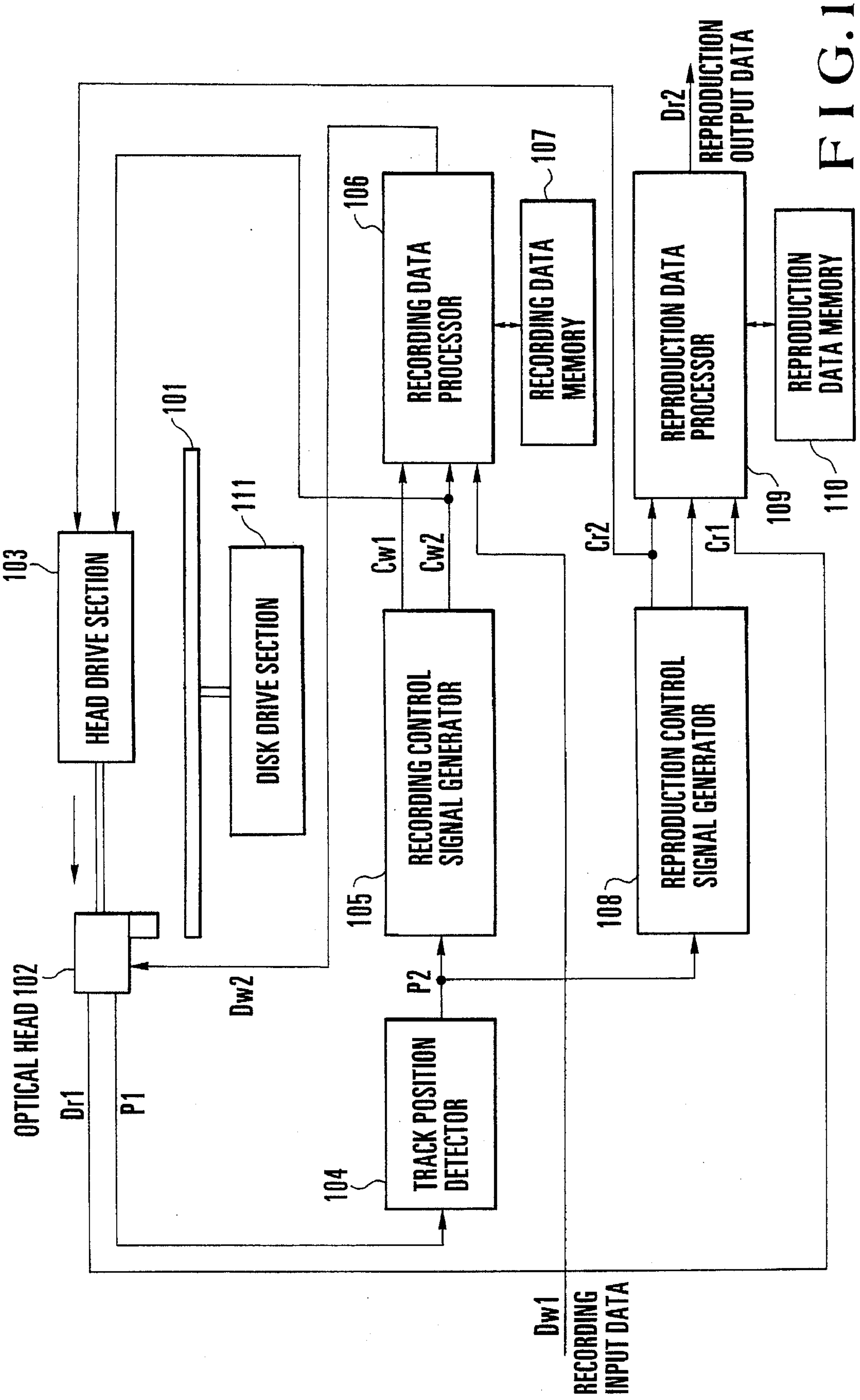
F I G. 1

TIME TRANSITION

MEMORY WRITE (HF NUMBER)

MEMORY READ (HF NUMBER)

TRACK NUMBER
1HF
1HF+4SB
CB0
CB1

FIG.3A  TIME TRANSITION
FIG.3B  TRACK NUMBER
FIG.3C  MEMORY WRITE (HF NUMBER)
FIG.3D  MEMORY READ (HF NUMBER)

FIG.3A′  TIME TRANSITION
FIG.3B′  TRACK NUMBER
FIG.3C′  MEMORY WRITE (HF NUMBER)
FIG.3D′  MEMORY READ (HF NUMBER)

FIG.3A″  TIME TRANSITION
FIG.3B″  TRACK NUMBER
FIG.3C″  MEMORY WRITE (HF NUMBER)
FIG.3D″  MEMORY READ (HF NUMBER)

F I G. 4
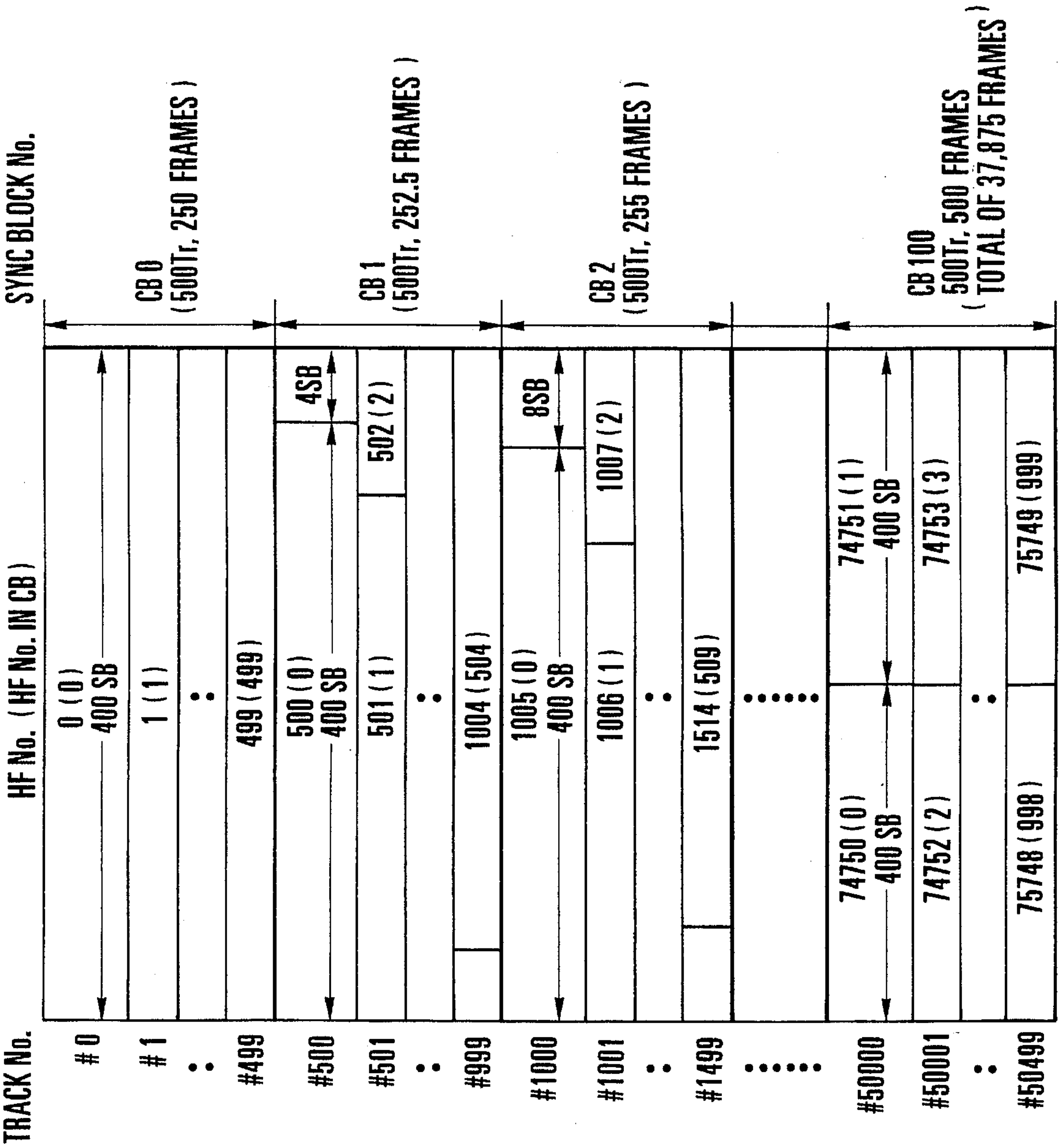

| TRACK No. | RECORDING TRACK (→ TIME) | DIAMETER (m) | SHORTEST RECORDING WAVE LENGTH (m) | TJ TIME (sec) |
|---|---|---|---|---|
| #0 | TA \| HF DATA (400 SBS) \| TJ | 0.06 | 0.06π · 59.94/38M=0.297μ | (1/59.94)·150μ·16.168m=365μ |
| #499 | TA \| HF DATA (400 SBS) \| TJ | | | |
| #500 | TA \| HF DATA + 4 SBS (404 SBS) \| TJ | 0.0606 | 0.0606π · 59.35/38M=0.297μ | (1/59.35)·150μ·16.330m=369μ |
| #999 | TA \| HF DATA + 4 SBS (404 SBS) \| TJ | | | |
| #1000 | TA \| HF DATA + 8 SBS (408 SBS) \| TJ | 0.0612 | 0.0612π · 58.76/38M=0.297μ | (1/58.76)·150μ·16.492m=376μ |
| #1499 | TA \| HF DATA + 8 SBS (408 SBS) \| TJ | | | |
| #50000 | TA \| HF DATA + HF DATA (800 SBS) \| TJ | 0.12 | 0.12π · 29.97/38M=0.297μ | 0.12π · 29.97/38M=0.297μ (1/29.97)·150μ·32.337m=880μ |
| #50499 | TA \| HF DATA + HF DATA (800 SBS) \| TJ | | | |
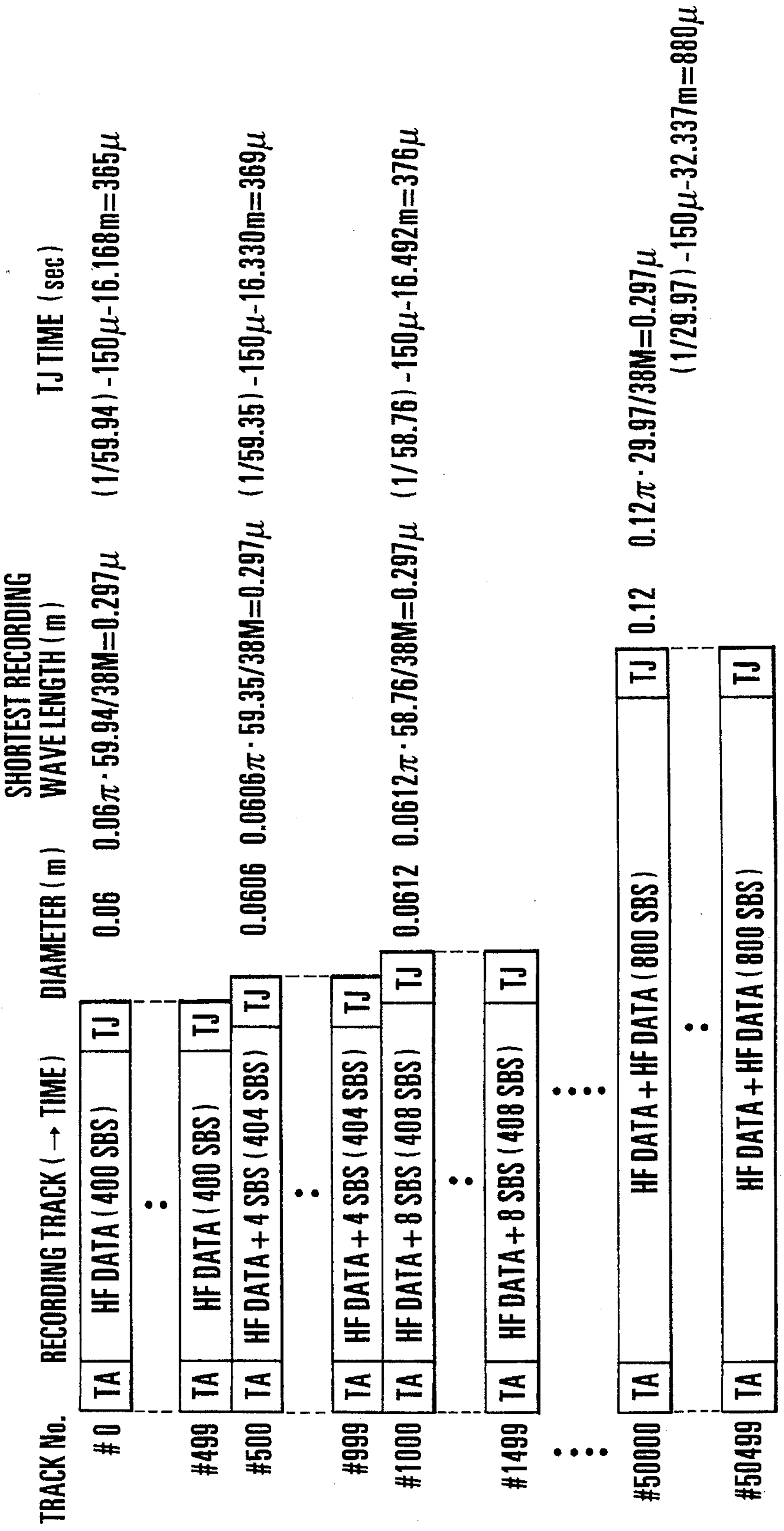
F I G. 5

| TRACK No. | RECORDING TRACK (→ TIME) | DIAMETER (m) | SHORTEST RECORDING WAVE LENGTH (m) | TJ TIME (sec) |
|---|---|---|---|---|
| #0 | TA \| HF DATA(400 SBS) \| TJ | 0.06 | $0.06\pi \cdot 60.24/38M = 0.299\mu$ | $(1/60.24) - 150\mu - 16.168m = 282\mu$ |
| #64 | TA \| HF DATA(400 SBS) \| TJ | 0.0600768 | $0.0600768\pi \cdot 60.09/38M = 0.298\mu$ | $(1/60.09) - 150\mu - 16.168m = 324\mu$ |
| #188 | TA \| HF DATA(400 SBS) \| TJ | 0.0602256 | $0.0602256\pi \cdot 59.94/38M = 0.298\mu$ | $(1/59.94) - 150\mu - 16.168m = 324\mu$ |
| #312 | TA \| HF DATA(400 SBS) \| TJ | 0.0603774 | $0.0603774\pi \cdot 59.79/38M = 0.298\mu$ | $(1/59.79) - 150\mu - 16.168m = 407\mu$ |
| #436 | TA \| HF DATA(400 SBS) \| TJ | 0.0605232 | $0.0605232\pi \cdot 59.64/38M = 0.298\mu$ | $(1/59.64) - 150\mu - 16.168m = 449\mu$ |
| #499 | TA \| HF DATA(400 SBS) \| TJ | | | |
| #500 | TA \| HF DATA + 4 SBS \| TJ (404 SBS) | 0.0606 | $0.0606\pi \cdot 59.64/38M = 0.299\mu$ | $(1/59.79) - 150\mu - 16.330m = 287\mu$ |
| #564 | TA \| HF DATA + 4 SBS \| TJ (404 SBS) | 0.0606768 | $0.0606768\pi \cdot 59.49/38M = 0.298\mu$ | $(1/59.49) - 150\mu - 16.330m = 330\mu$ |
| #688 | TA \| HF DATA + 4 SBS \| TJ (404 SBS) | 0.0608258 | $0.0608258\pi \cdot 59.35/38M = 0.298\mu$ | $(1/59.35) - 150\mu - 16.330m = 369\mu$ |
| #812 | TA \| HF DATA + 4 SBS \| TJ (404 SBS) | 0.0609744 | $0.0609744\pi \cdot 59.20/38M = 0.298\mu$ | $(1/59.20) - 150\mu - 16.330m = 412\mu$ |
| #936 | TA \| HF DATA + 4 SBS \| TJ (404 SBS) | 0.0611232 | $0.0611232\pi \cdot 59.05/38M = 0.298\mu$ | $(1/59.05) - 150\mu - 16.330m = 455\mu$ |
| #999 | TA \| HF DATA + 4 SBS \| TJ | | | |
| #1000 | TA \| HF DATA + 8 SBS \| TJ (408 SBS) | 0.0612 | $0.0612\pi \cdot 58.76/38M = 0.297\mu$ | $(1/58.78) - 150\mu - 16.492m = 376\mu$ |
| #1499 | TA \| HF DATA + 8 SBS \| TJ (408 SBS) | | | |
| #5000 | TA \| HF DATA + HF DATA (800 SBS) \| TJ | 0.12 | $0.12\pi \cdot 30.05/38M = 0.298\mu$ | $(1/30.05) - 150\mu - 32.337m = 791\mu$ |
| #50064 | TA \| HF DATA + HF DATA (800 SBS) \| TJ | 0.1200768 | $0.1200768\pi \cdot 30.01/38M = 0.298\mu$ | $(1/30.01) - 150\mu - 32.337m = 835\mu$ |
| #50188 | TA \| HF DATA + HF DATA (800 SBS) \| TJ | 0.1202256 | $0.1202256\pi \cdot 29.97/38M = 0.298\mu$ | $(1/29.97) - 150\mu - 32.337m = 880\mu$ |
| #50312 | TA \| HF DATA + HF DATA (800 SBS) \| TJ | 0.1203744 | $0.1203744\pi \cdot 29.93/38M = 0.298\mu$ | $(1/29.93) - 150\mu - 32.337m = 924\mu$ |
| #50436 | TA \| HF DATA + HF DATA (800 SBS) \| TJ | 0.1205232 | $0.1205232\pi \cdot 29.90/38M = 0.298\mu$ | $(1/29.90) - 150\mu - 32.337m = 958\mu$ |
| #50499 | TA \| HF DATA + HF DATA (800 SBS) \| TJ | | | |

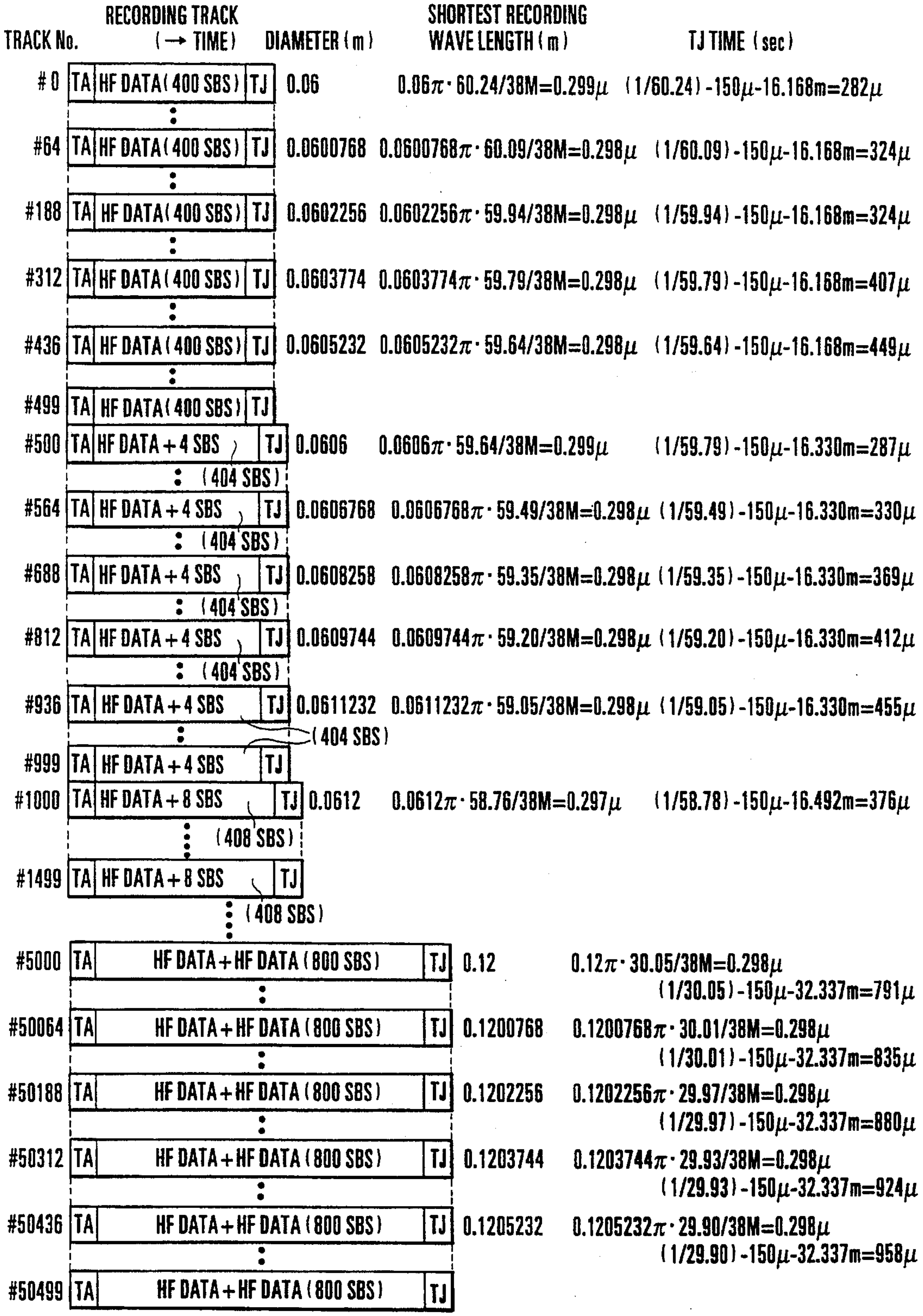

FIG. 7

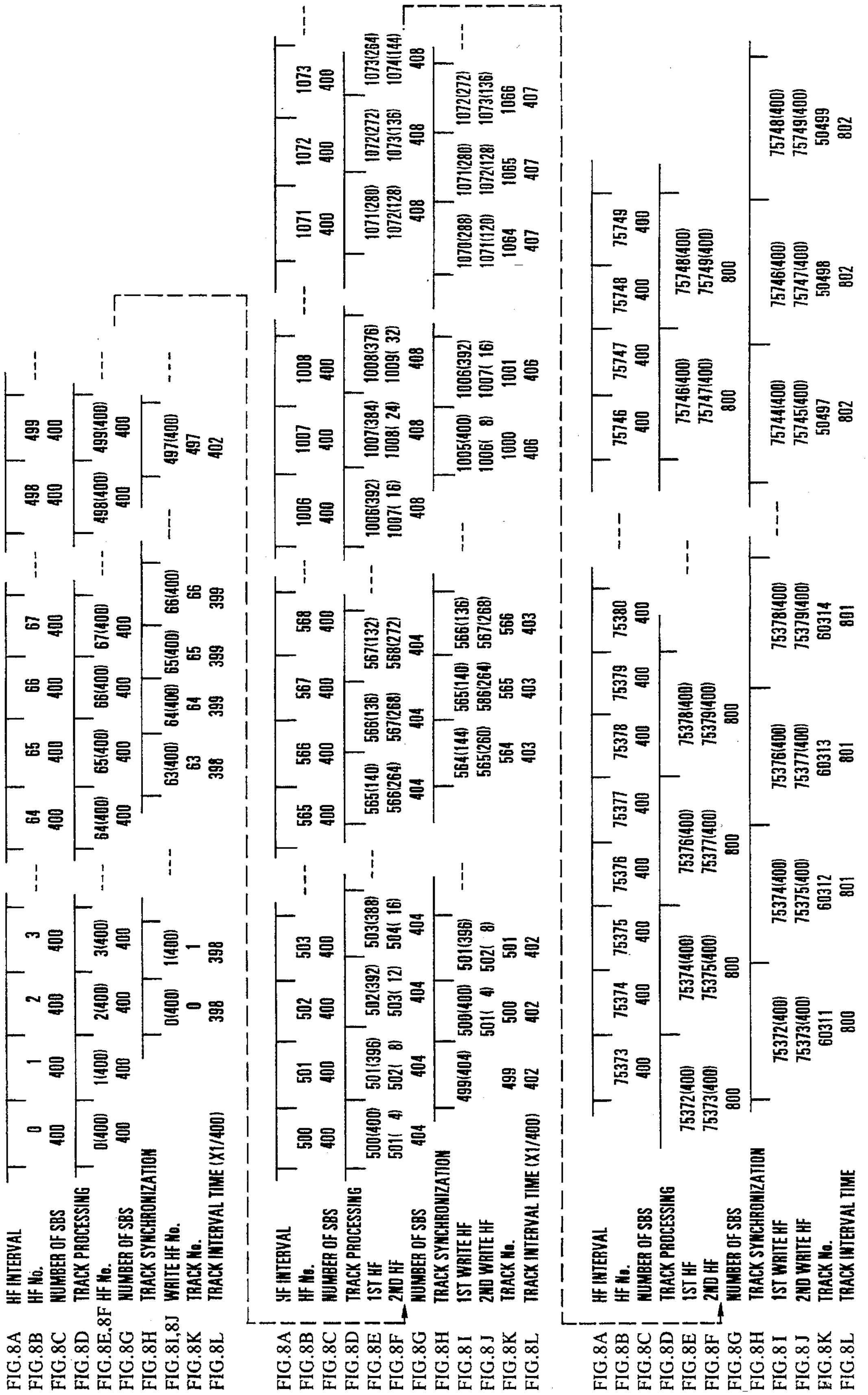
FIG.8A HF INTERVAL
FIG.8B HF No.
FIG.8C NUMBER OF SBS
FIG.8D TRACK PROCESSING
FIG.8E,8F HF No.
FIG.8G NUMBER OF SBS
FIG.8H TRACK SYNCHRONIZATION
FIG.8I,8J WRITE HF No.
FIG.8K TRACK No.
FIG.8L TRACK INTERVAL TIME (X1/400)
FIG.8E 1ST HF
FIG.8F 2ND HF
FIG.8I 1ST WRITE HF
FIG.8J 2ND WRITE HF
TRACK INTERVAL TIME TIME TRANSITION
TRACK NUMBER
1ST MEMORY WRITE (HF NUMBER)
2ND MEMORY WRITE (HF NUMBER)
MEMORY READ (HF NUMBER)
(a)
(b)

OPTICAL DISK APPARATUS AND RECORDING/REPRODUCTION METHOD THEREFOR

BACKGROUND OF THE INVENTION

The present invention relates to an optical disk apparatus and a recording/reproduction method therefor and, more particularly, to an optical disk apparatus for recording digital video data and other digital data such as audio data and system data on an optical disk (including magnetooptical disk), which is rotated at a constant angular velocity with a constant recording wave length, and a recording/reproduction method for the disk apparatus.

As a recording scheme for an optical disk, a CWL (Constant Wave Length)-CAV (Constant Angular Velocity) scheme is available, in which high-density recording can be performed, and a high-speed search can be made in the reproduction mode. In this scheme, while the rotational speed of an optical disk is kept constant, a recording operation is performed with a constant wave length.

As shown in FIG. 10, a conventional CWL-CAV optical disk apparatus rotates an optical disk 21, which has recordable upper and lower surfaces, at a constant angular velocity. This disk apparatus has optical heads 22 and 23 arranged on the upper and lower surface sides of the optical disk 21. The optical head 22 is moved from the outer periphery to the inner periphery of the optical disk 21, as indicated by an arrow A. The optical head 23 is simultaneously moved from the inner periphery to the outer periphery of the optical disk 21, as indicated by an arrow B. With this operation, data is recorded. In this case, the distances from the center of the optical disk 21 to the respective heads 22 and 23 are detected, and the peripheral velocity ratio between tracks on which the optical heads 22 and 23 are respectively located is obtained. Data distribution is then performed on the basis of the track peripheral velocity ratio such that the sum total of the bit rates of recording data supplied to the optical heads 22 and 23 is kept constant, thereby recording data with a constant wave length.

FIG. 11 shows the conventional optical disk apparatus. Referring to FIG. 11, the optical heads 22 and 23 are arranged at the upper and lower surfaces of the optical disk 21. The optical head 22 is scanned from the outer periphery to the inner periphery, while the optical head 23 is scanned from the inner periphery to the outer periphery. At the same time, pieces of head position information 31*a* and 31*b* are input to head position information detectors 41*a*, 41*b*, 61*a*, and 61*b*. The pieces of head position information 31*a* and 31*b* may be pieces of mechanical position information or track address information.

On the recording side, recording clock generators 42*a* and 42*b* generate bit clocks having frequencies corresponding to the pieces of head position information. In this case, when the optical head 22 or 23 is located at an outer peripheral position, the corresponding bit clock has a high frequency. When the optical head 22 or 23 is located at an inner peripheral position, the corresponding bit clock has a low frequency.

Subsequently, a recording signal processor 43 performs signal processing of an input signal 51 on the basis of the bit clocks from the recording clock generators 42*a* and 42*b*, thereby distributing video data to the optical heads 22 and 23 in accordance with the pieces of head position information. In this case as well, when the head 22 or 23 is located at an outer peripheral position, the corresponding distribution amount is set to be large. When the head 22 or 23 is located at an inner peripheral position, the corresponding distribution amount is set to be small.

On the reproduction side, reproduction clock generators 62*a* and 62*b* operate a phase-locked loop circuit (PLL) at a center frequency corresponding to the pieces of head position information 31*a* and 31*b*, thereby generating a bit clock synchronized with a reproduction signal.

After this operation, a reproduction signal processor 63 performs signal processing on the basis of the bit clocks from the reproduction clock generators 62*a* and 62*b*, and finally outputs an output signal 71.

A case wherein data is recorded on the optical disk 21 shown in FIG. 5, which has a diameter of 30 cm and recordable upper and lower surfaces, will be described below.

Assume that the outermost and innermost peripheries of a doughnut-like recording area of the optical disk 21 respectively have diameters of 28.9000 cm and 15.0568 cm. Also assume that the recording area of the optical disk 21 is divided into 103 equal areas in the radial direction, and data is recorded on each divided area at the same bit rate. The optical disk 21 is rotated at a constant angular velocity, and the peripheral velocity is proportional to the distance from the center of the optical disk 21. Therefore, the peripheral velocity on the outer periphery side is higher than that on the inner periphery side.

TABLE 1

| Step | Position of Upper-Surface-Side Optical Head (cm) | Position of Lower-Surface-Side Optical Head (cm) | Upper-Surface-Side Data Distribution Amount (SB) | Lower Surface-Side Data Distribution Amount (SB) |
|---|---|---|---|---|
| 0 | 28.9000–28.7656 | 15.0568–15.1912 | 1730 | 914 |
| 1 | 28.7656–28.6312 | 15.1912–15.3256 | 1722 | 922 |
| . | . | . | . | . |
| . | . | . | . | . |
| . | . | . | . | . |
| 102 | 15.1912–15.0568 | 28.7656–28.9000 | 914 | 1730 |

As the optical heads 22 and 23 at the upper and lower surfaces of the optical disk 21 are simultaneously moved from step 0 to step 102, the peripheral velocity ratio in areas where the optical heads 22 and 23 are respectively located gradually changes in 103 steps. In this case, data distribution is controlled such that the distribution amount of one of the optical heads 22 and 23 located on the outer periphery side is increased, while the data distribution amount of the other of the optical heads 22 and 23 located on the inner periphery side is decreased, in accordance with the peripheral velocity ratios. With this control, one-frame recording data can be recorded on one peripheral track on each of the upper and lower surfaces of the optical disk 21 with an almost constant recording wave length.

Assume that the amount of one-frame recording data is 2,644 sync blocks. In this case, a sync block (to be abbreviated as SB) is a data string consisting of a total of 192 bytes, i.e., a 2-byte sync signal, a 2-byte ID signal indicating an address, 172-byte data, and a 16-byte error correction code.

At the start of a recording operation, the upper-surface-side optical head 22 is located above the outermost track in contact with a circle having a diameter of 28.9000 cm, and the lower-surface-side optical head 23 is located above the innermost track in contact with a circle having a diameter of 15.0568 cm. At this time, the peripheral velocity ratio is 28.9000/15.0568≈1730/914. Therefore, in step 0, 1,730 SBs of one-frame recording data consisting of 2,644 SBs are distributed to the upper-surface-side optical head 22, and the remaining 914 SBs are distributed to the lower-surface-side optical head 23. That is, the upper-surface-side optical head 22 writes 1,730 SBs per track within a track area ranging from a diameter of 28.9000 cm to a diameter of 28.765 cm. Meanwhile, the lower-surface-side optical head 23 writes 914 SBs per track within a track area having diameters ranging from 15.0568 cm to 15.1912 cm.

As the optical heads 22 and 23 are moved, 1.344 mm at a time, from step 0 to step 102, the data distribution amount of the upper-surface-side optical head 22 decreases stepwise by 8 SBs, and at the same time, the data distribution amount of the lower-surface-side optical head 23 increases stepwise by 8 SBs. At last step 102, the data distribution amounts of the upper- and lower-surface-side optical heads 22 and 23 are respectively set to be 1,730 SBs and 914 SBs. In this manner, data distribution is controlled in accordance with peripheral velocity ratios, thereby recording data with a constant recording wave length.

In the above conventional disk apparatus, in order to record data on an optical disk by the CWL-CAV scheme, the optical disk 21 having recordable upper and lower surfaces is used, and the optical heads 22 and 23 are respectively arranged on the upper and lower surface sides of the optical disk 21. Therefore, the optical disk 21 having recordable upper and lower surfaces and the two optical heads 22 and 23 are required. In addition, in the reproduction mode, since synchronization must be established between the optical heads 22 and 23 located on the upper and lower surface sides, problems are posed in terms of cost and mechanical precision.

SUMMARY OF THE INVENTION

It is an object of the present invention to provide an optical disk apparatus and a recording/reproduction method therefor which can record data on an optical disk, by using one optical head, with a constant recording wave length at a constant angular velocity.

It is another object of the present invention to provide an optical disk and a recording/reproduction method therefor which can realize a reduction in cost and requires no high mechanical precision.

In order to achieve the above objects, according to the present invention, there is provided an optical disk apparatus comprising an optical storage medium rotated at a constant angular velocity, the optical storage medium having a storage area constituted by track areas ranging from a 0th area on an innermost periphery to an nth area on an outermost periphery of the storage area, and the track areas being set by dividing the storage area into (n+1) equal areas (n is an integer satisfying $n \geqq 1$) in a radial direction, an optical head for optically recording and reproducing recording data on and from the optical storage medium with a constant wave length, head drive control means for driving/controlling the optical head, and data generating means for generating recording data such that a data amount is increased by $\Delta A$ (A is the amount of recording data per track when the optical head is located in the 0th track area) every time the optical head moves to a next track area, and outputting the recording data to the optical head, wherein the recording data amount A and the increase $\Delta A$ are set such that a ratio between a track diameter in an mth track area (m is an integer satisfying $n \geqq m \geqq 0$) and a recording data amount ($A+\Delta A \times m$) is made substantially constant.

BRIEF DESCRIPTION OF THE DRAWINGS

FIG. 1 is a block diagram showing an optical disk apparatus according to an embodiment of the present invention;

FIG. 4 is a view showing the track configuration of a magnetooptical disk;

FIG. 5 is a view showing a recording track configuration in a rotational speed clock block control scheme;

FIG. 7 is a recording track configuration in a rotational speed servo block control scheme;

FIGS. 8A to 8L are timing charts for explaining the rotational speed servo block control scheme;

DESCRIPTION OF THE PREFERRED EMBODIMENTS

Figures 2A, 2B, 2C, 2D:
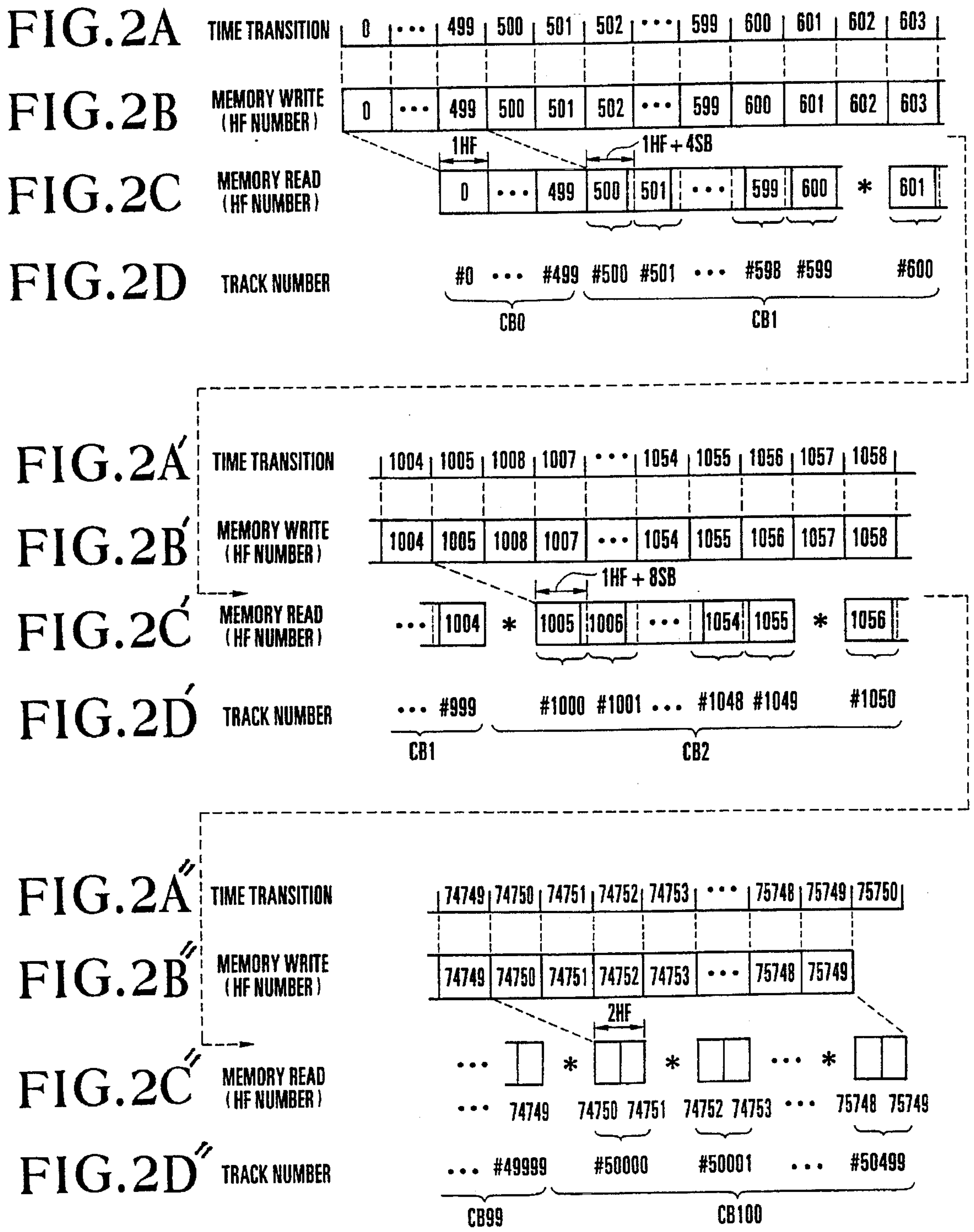
FIGS. 2A to 2D, 2A'-2D' and 2A"-2D" are timing charts for explaining the operation of a recording data processor in FIG. 1.

The present invention will be described next with reference to the accompanying drawings.

FIG. 1 shows an optical disk apparatus according to an embodiment of the present invention. In this disk apparatus, an optical disk 101 is driven by a disk drive section 111 to be rotated at a constant angular velocity. An optical head 102 is driven by a head drive section 103 to move in the radial direction from the inner periphery to the outer periphery of the optical disk 101 so as to write recording data Dw2 on the optical disk 101 or read data recorded on the optical disk 101 and output it as reproduction data Dr1.

A track position detector 104 receives position information P1 from the optical head 102 and outputs a signal P2 indicating the position of a track. As a method of detecting a track position, for example, one of the following methods may be used: a method of detecting a track position by mechanically reading the position of the optical head 102; and a method of detecting a track position by recording track address information on the optical disk 101 in advance and reading the track address information.

A recording control signal generator 105 outputs a recording clock signal Cw1 and a pause track control signal Cw2 on the basis of the track position signal P2 from the track position detector 104. A recording data processor 106 performs video/audio synthesis, shuffling, addition of an error correction code, modulation, addition of a sync signal, and the like with respect to recording input data Dw1 from the recording control signal generator 105 in a predetermined data unit at a predetermined rate, and temporarily writes the resultant data in a recording data memory 107. At the same time, the recording data processor 106 generates the recording data Dw2 by reading data from the recording data memory 107 in accordance with the recording clock signal Cw1 and the pause track control signal Cw2 from the recording control signal generator 105, and outputs the recording data Dw2 to the optical head 102.

A reproduction control signal generator 108 outputs a reproduction clock signal Cr1 and a repeat track control signal Cr2 on the basis of the track position signal P2 from the recording control signal generator 105. A reproduction data processor 109 temporarily writes the reproduction data Dr1 read by the optical head 102 in a reproduction data memory 110 in accordance with the reproduction clock signal Cr1 and the repeat track control signal Cr2 from the reproduction control signal generator 108. At the same time, the reproduction data processor 109 performs sync signal detection/demodulation, error correction, deshuffling, video/audio separation, and the like with respect to the data, read out from the reproduction data memory 110, in a predetermined data unit at a predetermined rate. The reproduction data processor 109 outputs the resultant data as reproduction output data Dr2. The head drive section 103 receives the pause track control signal Cw2 from the recording control signal generator 105 and the repeat track control signal Cr2 from the reproduction control signal generator 108, and performs drive control of the optical head 102.

The operation of this embodiment using a magnetooptical disk having a diameter of 13 cm will be described next.

Assume that the innermost and outermost peripheries of the recording area of the magnetooptical disk respectively have diameters of 60.0 mm and 120.6 mm, and the track pitch is 0.6 μm. In this case, the total number of tracks of the recording area is 50,500. This recording area is divided into 101 equal areas in the radial direction. Each divided area is called "clock block" (abbreviated as CB). The number of tracks per CB is 500. If the clock block on the innermost periphery is represented by CB0, the optical head 102 is moved from CB0 to CB100 on the outermost periphery.

The data Dw2 to be recorded on the magnetooptical disk is obtained as follows. A television signal of an existing television scheme, in which the frame frequency is 30/1.001 Hz and the number of lines per frame is 525, is quantized into 8-bit data by using a sampling frequency of 13.5 MHZ. The resultant data is then compressed by intra-frame fixed length coding. In addition, audio data, an error correction code, and the like are added to the data, thereby obtaining a 192-byte data string as the recording data Dw2. In this case, each 192-byte data string is called "sync block"(abbreviated as SB), and the amount of recording data per frame is 800 SBs. In addition, half the amount of one-frame recording data, i.e., 400 SBs, is called "half frame" (abbreviated as HF). This half frame does not necessarily coincide with the amount of data corresponding to one field of a television signal and is based on a different concept. The average bit rate of the recording data Dw2 is 800 [SBs]×192 [bytes]×8 [bits]×30/1.001 [Hz]≈36.827 [megabits/s].

The optical head 102 sequentially records the recording data Dw2 on the magnetooptical disk, which is rotated at a predetermined velocity of 60/1.001 rps, from the track on the innermost periphery. In this case, as shown in Table 2, the optical head 102 records 1 HF (400 SBs) per track in CB0 on the innermost periphery. Every time the optical head 102 moves to the next clock block, the amount of recording data per track is increased by 4 SBs. In CB100 on the outermost periphery, the optical head 102 records one-frame data (800 SBs) per track. Although the average peripheral velocity in CB100 is twice that in CB0, the recording wave length is kept constant by setting the amount of recording data per track in CB100 to be twice that in CB0.

TABLE 2

| Clock Block | Track Diameter (mm) | Track Number | Number of Recording Data per Track | Recording Clock Frequency (MHz) | Total Recording Data Amount (HF) |
|---|---|---|---|---|---|
| 0 | 60.0 | 0 | 400 (1HF) | 55.2 | 500 |
| | . | . | | | |
| | . | . | | | |
| | . | . | | | |
| | 60.6 | 499 | | | |
| 1 | 60.6 | 500 | 400 + 4 | 55.8 | 505 |
| | . | . | | | |
| | . | . | | | |
| | . | . | | | |
| | 61.2 | 999 | | | |
| 2 | 61.2 | 1000 | 400 + 8 | 56.3 | 510 |
| | . | . | | | |
| | . | . | | | |
| | . | . | | | |
| | 61.8 | 1499 | | | |
| . | . | . | . . | . | |
| . | . | . | . . | . | |
| . | . | . | . . | . | |
| 100 | 120.0 | 50000 | 400 + 400 | 110.5 | 1000 |
| | . | . | | | |
| | . | . | | | |
| | . | . | | | |
| | 120.6 | 50499 | | | |

As shown in Table 2, CBO is a recording area having diameters from 60.0 mm to 60.6 mm and 500 tracks. On this recording area, data corresponding to 1 HF (400 SBs) is recorded per track. Therefore, data corresponding to 500 HFs, i.e., 250 frames, can be recorded in CB0 as a whole. If 1,7 codes are used, and redundant areas for track addresses and track jump and the like are neglected, a frequency f0 of the recording clock signal Cw1 in CB0 can be given by $$f0=400\times192\times8\times60/1.001\times1.5\approx55.2\ \text{MHz}$$

In addition, a shortest recording wave length Lw0 is given by $$Lw0=(\pi\times60)/(400\times192\times8)\approx0.307\ \mu\text{m}$$

CB1 is a recording area having diameters from 60.6 mm to 61.2 mm and 500 tracks. On this recording area, data corresponding to 1 HF+4 SBs is recorded. Therefore, data corresponding to 505 HFs, i.e., 252.5 frames, can be recorded in CB1 as a whole. A frequency f1 of a recording clock in CB1 is given by $$f1=404\times192\times8\times60/1.001\times1.5\approx55.8\ \text{MHz}$$

In addition, a shortest recording wave length Lw1 is given by $$Lw1=(\pi\times60.6)/(404\times192\times8)\approx0.307\ \mu\text{m}$$

Similarly, every time the optical head 102 moves to the next CB, the amount of recording data per track is increased by 4 SBs. In CB100 on the outermost periphery, data corresponding to 1 HF+400 SBs, i.e., one frame, is recorded per track. A frequency f100 of a recording clock in CB100 is given by $$f100=800\times192\times8\times60/1.001\times1.5\approx110.5\ \text{MHz}$$

In addition, a shortest recording wave length Lw100 is given by $$Lw100=(\pi\times 120)/(800\times 192\times 8)\approx 0.307\ \mu m$$

As described above, the shortest recording wave length in each clock block can be kept constant by changing the recording clock frequency for each clock block. Note that the total recording data amount of this magnetooptical disk is 75,750 HFs.

Assume that the recording area of an optical disk, which has an innermost track diameter Li, is divided into n+1 equal areas (n is an integer satisfying n≧1) CB0 to CBn, each having a width ΔL, in the radial direction, with CB0 being defined as the innermost area, and the amount of recording data per track within CB0 is represented by A. Also assume that every time the optical head 102 moves to the next area, the recording data amount is increased by ΔA. In this case, the shortest recording wave length per data in an area CBm ( is an integer satisfying n≧m≧0) can be given by equation (1):

$$\text{shortest recording wave length in } CBm=\pi\cdot(Li+\Delta L\cdot m)/(A+\Delta A\cdot m) \quad (1)$$

According to equation (1), therefore, the values A and ΔA may be set such that the shortest recording wave length in each area is made as constant as possible.

It is apparent that even if the optical head 102 is moved from the outermost periphery to the innermost periphery of the optical disk, the same result as described above can be obtained. In this case, let Lo be the outermost track diameter, CBn be the outermost area obtained when the recording area is divided into (n+1) equal areas (n is an integer satisfying n ≧1), and B be the amount of recording data per track in CBn. If the recording data amount is decreased by ΔB every time the optical head 102 moves to the next area, the shortest recording wave length per data can be given by equation (2):

$$\text{shortest recording wave length in } CBm=\pi\cdot(L0-\Delta L\cdot m)/(B-\Delta B\cdot m) \quad (2)$$

According to equation (2), therefore, the values B and ΔB may se set such that the shortest recording wave length in each area is made as constant as possible.

Generation of the recording data Dw2 will be described next.

The recording data processor 106 performs recording data processing, e.g., video/audio synthesis, shuffling, and addition of an error correction code, with respect to the recording input data Dw1 in units of HFs at equal time intervals. The recording data processor 106 temporarily writes the resultant data in the recording data memory 107, and generates the recording data Dw2 by reading out the data from the recording data memory 107 in accordance with the recording clock signal Cw1 and the pause track control signal Cw2.

In CB0, the recording data Dw2 corresponding to 1 HF per track is to be supplied to each of track numbers 0 to 499 shown in FIG. 2D. Therefore, the recording data processor 106 temporarily writes processed data in the recording data memory 107 at the timing shown in FIG. 2B, and reads out data therefrom at the timing shown in FIG. 2C in accordance with the recording clock signal Cw1 having the frequency f0. In this case, the duration of 1 HF of the recording input data Dw1 is used as a unit of time transition, and serial numbers are assigned to the respective HFs.

In CB1 as the next clock block, in order to send recording data corresponding to 1 HF+4 SBs per track, the recording data processor 106 reads out data from the recording data memory 107 in accordance with the recording clock frequency f1. In this case, after a reading operation is performed in accordance with the recording clock frequency with respect to track numbers 500 to 599, data read and recording operations with respect to the recording data memory 107 and the disk are interrupted for a one-track period. Thereafter, the data read operation with respect to track number 600 and the data recording operation with respect to the disk are resumed. In this case, this pause operation is called "pause track".

This pause track is performed to match the data processing rate in the recording data processor 106 with the recording data rate. More specifically, the data processing rate in the recording data processor 106 is 1 HF per track period, whereas the recording data rate is 1 HF+4 SBs per track period. Therefore, a shortage of a processing time corresponding to 400 SBs (1 HF) occurs for every data processing period corresponding to 100 tracks. For this reason, a timing matching operation is performed by interrupting a recording operation with respect to the disk for a one-track period for every 100 tracks. In CB1, pause track is executed at track numbers 600, 700, 800, and 900, i.e., a total of four times. Note that in this pause track, the head drive section 103 controls the optical head 102 in accordance with the pause track control signal Cw2.

In CB2, as shown in FIG. 2C', pause track is performed for every 50 tracks, i.e., a total of 10 times, after pause track for every 100 tracks of CB1 is executed at first track number 1000. That is, in sending recording data corresponding to 1 HF+8 SBs per track, there is a shortage of a recording data processing time corresponding to 400 SBs for every 50 tracks. For this reason, pause track is performed at track numbers 1050, 1100, 1150, . . . , 1450.

Similarly, in a kth clock block CBk (k is an integer of 2 to 100), pause track is executed a total of 5×k times. In CB100 on the outermost periphery, as shown in FIG. 2C", pause track is performed for every track. By performing pause track in this manner, the data processing rate in the recording data processor 106 is matched with the recording data rate.

Letting A be the amount of data which can be processed by the recording data processor 106 for a one-track period, and (A+ΔA·k) be the amount of recording data per track in the kth clock block CBk (k is an integer of 1 to 100), equation (3) is established, provided that pause track is performed for every T tracks in CBk:

$$\Delta A\cdot k\cdot(T+1)\geqq A>\Delta A\cdot k\cdot T \quad (3)$$

If the optical disk is an overwrite medium, a recording operation may be continued in the occurrence of pause track, and data which has undergone recording data processing may be recorded after the optical head is returned by one track at the end of pause track. In this case as well, the pause track control signal Cw2 is sent to the head drive section 103 to control the optical head 102.

Generation of the reproduction output data Dr2 will be described next.

The reproduction data processor 109 temporarily writes the reproduction data Dr1 read by the optical head 102 in the reproduction data memory 110 in accordance with the reproduction clock signal Cr1. At the same time, the reproduction data processor 109 performs reproduction data processing, e.g., sync signal detection/demodulation, error correction, and video/audio separation, with respect to data, read out from the reproduction data memory 110, in units of HFs at equal timer intervals, and outputs the resultant data as the reproduction output data Dr2.

Figures 3A, 3B, 3C, 3D:
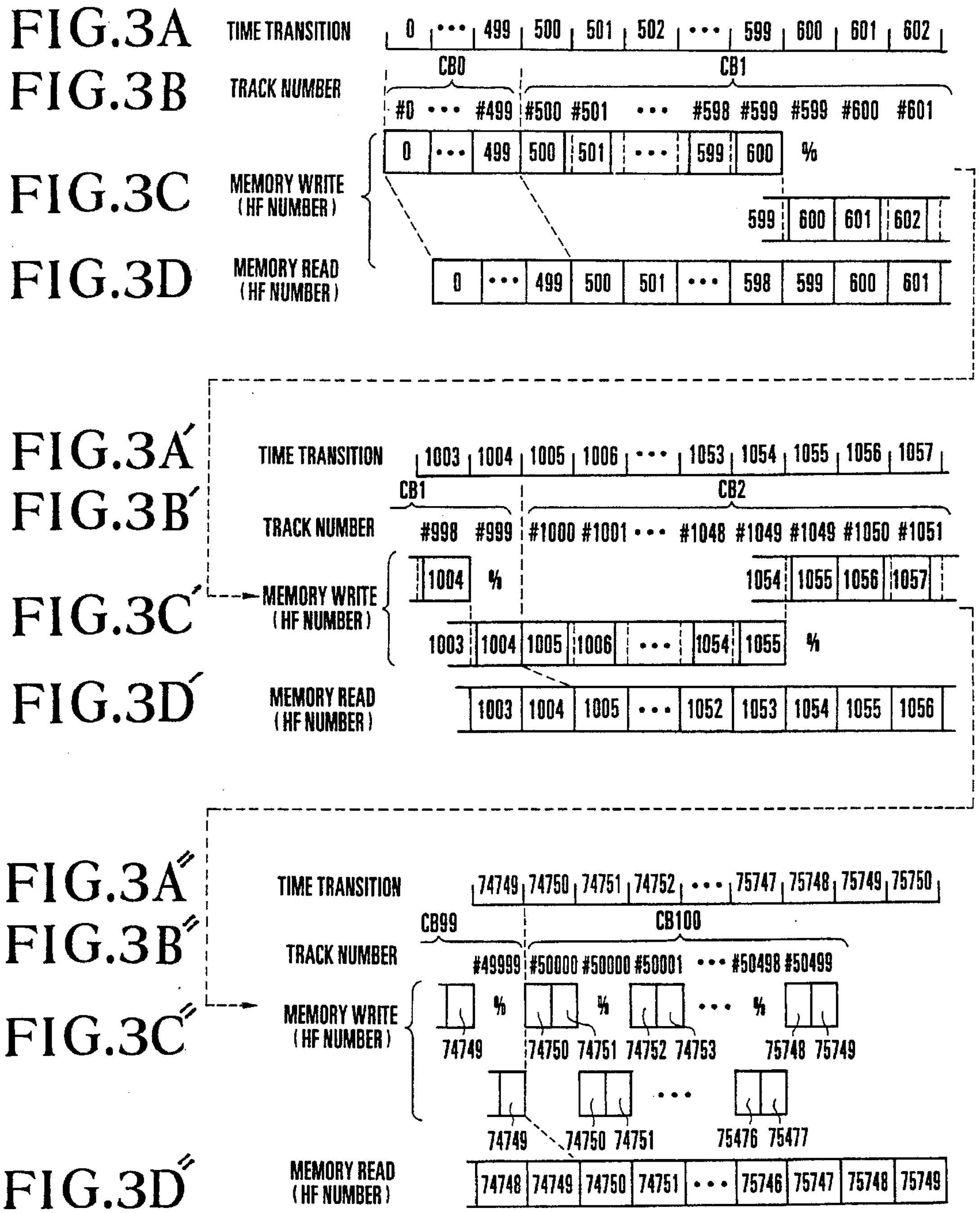
FIGS. 3A to 3D, 3A'-3D' and 3A"-3D" are timing charts for explaining the operation of a reproduction data processor in FIG. 1.
Figures 6A, 6B, 6C, 6D, 6E, 6F, 6G, 6H, 6I, 6J, 6K, 6L:
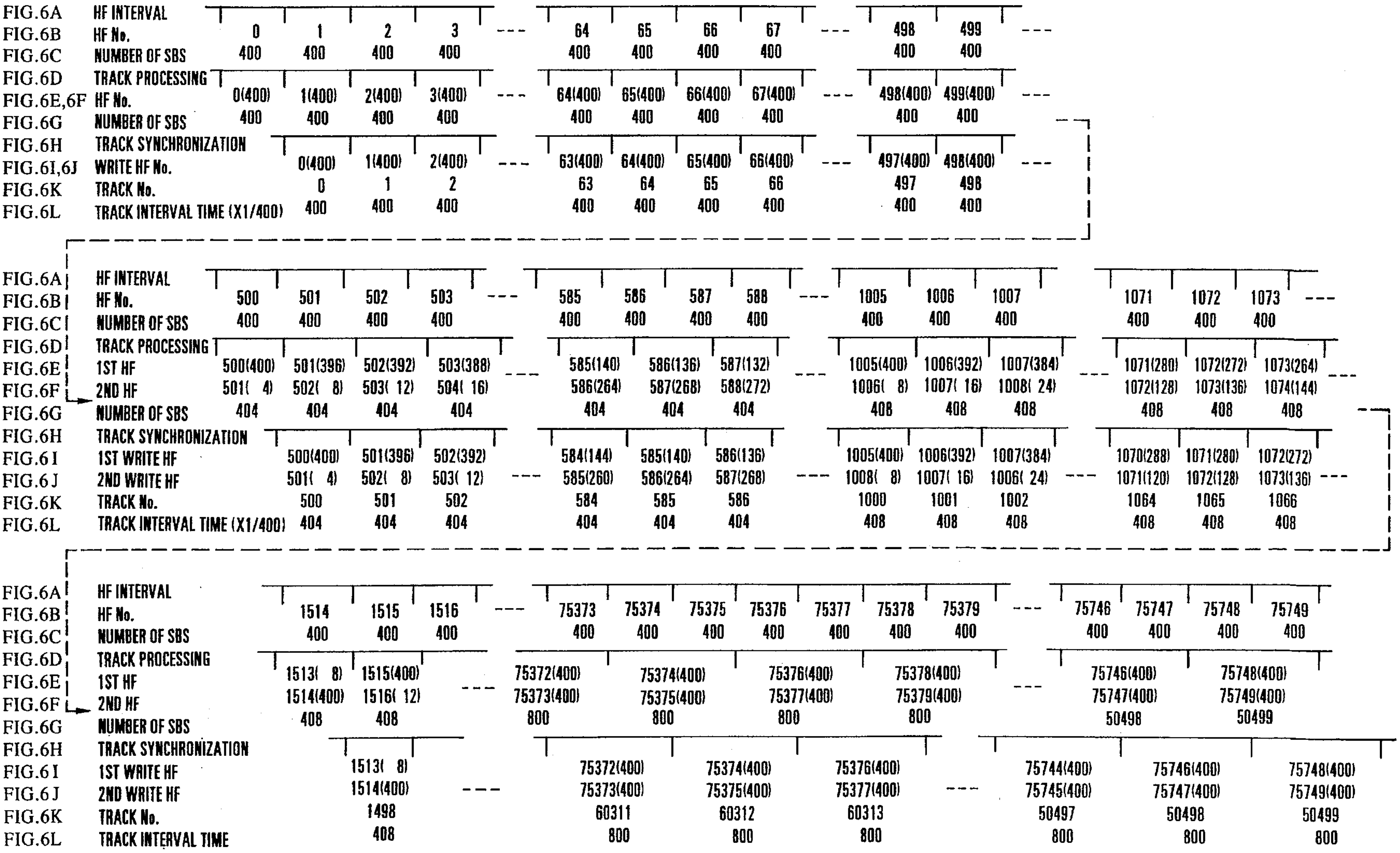
FIGS. 6A to 6L are timing charts for explaining the rotational speed clock block control scheme.

The reproduction data Dr1 corresponding to 1 HF per track is read from each of track numbers 0 to 499 of CB0 shown in FIG. 3B by the optical head 102. Therefore, in the time transition shown in FIG. 3A, normal read and write operations are performed with respect to the reproduction

TABLE 3

| Clock Block | Head Position (cm) | Track Number | Number of HFs (per Block/Total) | Number of Frames (per Block/Total) |
|---|---|---|---|---|
| CB0 | 60.000–60.600 | 0–500 | 500/500 | 250/250 |
| CB1 | 60.600–61.200 | 500–999 | 505/1005 | 252.5/502.5 |
| CB2 | 61.200–61.800 | 1000–1499 | 510/1515 | 255/757.5 |
| . | . | . | . | . |
| . | . | . | . | . |
| . | . | . | . | . |
| CB100 | 120.000–120.600 | 50000–50499 | 1000/75750 | 500/37875 |

data memory 110 in accordance with the reproduction clock signal Cr1 having the frequency f0 at the timings shown in FIGS. 3C and 3D, thereby generating the reproduction output data Dr2.

In CB1 as the next clock block, since reproduction data corresponding to 1 HF+4 SBs per track is sent, the reproduction data processor 109 writes the data in the reproduction data memory 110 in accordance with the reproduction clock signal Cr1 having the frequency f1, and reads data therefrom in accordance with the normal clock frequency f0. In this case, as shown in FIG. 3C, the reproduction data processor 109 reads out reproduction data corresponding to track numbers 500 to 599 from the reproduction data memory 110 in accordance with the clock frequency f0, and returns the optical head 102 by one track, as indicated by a mark "%" in FIG. 3C, to read out the reproduction data from track number 599 again. The reproduction data processor 109 then writes the reproduction data in the reproduction data memory 110. Such an operation, i.e., returning the optical head 102 by one track and reading data twice from the same track, is called "repeat track".

This repeat track is performed to match the data processing rate in the reproduction data processor 109 with the rate of the reproduction data Dr1. More specifically, similar to the case of the generation of recording data, the reproduction data processing rate is 1 HF per track period, whereas the reproduction data rate from CB1 is 1 HF+4 SBs per track period. Therefore, a shortage of a processing time corresponding to 400 SBs (1 HF) occurs for every reproduction data processing period for 100-track data. For this reason, a timing matching operation is performed by performing time adjustment corresponding to a one-track period for every 100 tracks. In CB1 as a whole, repeat track is performed at track numbers 599, 699, 799, 899, and 999, i.e., a total of five times. Note that in this repeat track, the head drive section 103 controls the optical head 102 in accordance with the repeat track control signal Cr2.

In CB2, as shown in FIG. 3C; repeat track is performed, for every 50 tracks, at track numbers 1049, 1099, 1149, . . . , 1499, i.e., a total of 10 times. Similarly, in each CBk (k is an integer of 1 to 99), repeat track is performed a total of 5×k times. In CB100 on the outermost periphery, as shown in FIG. 3C", repeat track is performed at 499 tracks (track numbers 0000 to 50498) excluding last track number 50499. Track repeat is performed in this manner to match the data processing rate in the reproduction data processor 109 with the reproduction data rate.

A data recording method for an optical disk apparatus according to an embodiment of the present invention will be described next with reference to FIG. 4.

FIG. 4 shows track division on a magnetooptical disk. Table 3 shows various magnetooptical disk specifications.

Referring to FIG. 4, CBO is defined by diameters from 60.0 mm to 60.6 mm and has a total of 500 tracks corresponding to track numbers 0 to 499. A total of 500 HFs (i.e., 250 frames) corresponding to HF numbers 0 to 499 are written at a rate of 1 HF per track.

CB1 is defined by diameters from 60.6 mm to 61.2 mm and has a total of 500 tracks corresponding to track numbers 500 to 999. A total of 505 HFs (i.e., 252.5 frames) corresponding to HF numbers 500 to 1004 are written at a rate of 1 HF+4 SBs per track. At the end of CB1, the cumulative number of tracks is 1,000, and the cumulative number of HFs is 1,005 (502.5 frames).

CB2 is defined by diameters from 61.2 mm to 61.8 mm and has a total of 500 tracks corresponding to track numbers 1000 to 1499. A total of 510 HFs (i.e., 255.0 frames) corresponding to HF numbers 1005 to 1514 are written at a rate of 1 HF per track. At the end of CB2, the cumulative number of tracks is 1,500, and the cumulative number of HFs is 1,515 (757.5 frames).

Subsequently, in each of CB3 to CB99, the number of bits to be written per track is increased by 4 SBs in this manner. Last CB100 is defined by diameters from 120.0 mm to 120.6 mm and has a total of 500 tracks corresponding to track numbers 5000 to 50499. A total of 1,000 HFs (i.e., 500 frames) corresponding to HF numbers 74750 to 75749 are written at a rate of 1 HF+400 SBs, i.e., 2 HFs, per track. At the end of CB100, the cumulative number of tracks is 50,500, and the cumulative number of HFs is 75,750 (37,875 frames).

As described above, a total number of recording frames is 37,875. Therefore, the total recording time and the shortest recording wave length in this embodiment are calculated, without considering track addresses and track jump gaps, as follows:

total recording time: $37875/(29.97 \times 60) = 21.06$ min shrtest recording wave length

*CB0*: $(2\pi \times 0.03)/(400 \times 192 \times 8) = 0.307$ μm

*CB1*: $(2\pi \times 0.0303)/(404 \times 192 \times 8) = 0.307$ μm

. .
. .
. .

*CB100*: $(2\pi \times 0.06)/(800 \times 192 \times 8) = 0.307$ μm

As is apparent, the shortest recording wave length is kept constant regardless of a recording position on the disk A data recording method for an optical disk apparatus according to another embodiment of the present invention will be described next with reference to FIGS. 5 and 6A to 6L.

A block for making the rotational speed of a disk is called "servo block" (to be referred to as an SB hereinafter). In this case, control is performed while a constant rotational speed is set for each CB. This scheme is called "rotational speed clock block control scheme". In the rotational speed clock block control scheme, CB=SB.

Letting V be the HF frequency (59.94 Hz), A be the number (400) of SBs per track in CBO, and B be the number (4) of SBs increased per track with an increase in CB number, the disk rotational speed in CBm can be given by VA/(A+mB). For example, in CB2, the rotational speed is 59.94·400/(400+2·4)=58.76 rps

TABLE 4

| CB | SB | Track Number | Number of Tracks | Disk Rotational Speed [rps] (Arithmetic Expression) | Number of SBs per Track | Recording HF: Start Track | Recording HF: Recording HF Number (Number of SBs) |
|---|---|---|---|---|---|---|---|
| 0 | 0 | 0–499 | 500 | 59.94 (59.94 × 400/400) | 400 | 0 | 0 (400) |
| 1 | 1 | 500–999 | 500 | 59.35 (59.94 × 400/404) | 404 | 500 | 500 (400) + 501 (4) |
| 2 | 2 | 1000–1499 | 500 | 58.76 (59.94 × 400/408) | 408 | 1000 | 1005 (400) + 1006 (8) |
| 3 | 3 | 1500–1999 | 500 | 58.19 (59.94 × 400/412) | 412 | 1500 | 1515 (400) + 1516 (12) |
| ⋮ | | | | | | | |
| m | m | 500m–500m + 499 | 500 | [59.94 × 400]/[4m + 400] | 4n + 400 | 500m | * |
| ⋮ | | | | | | | |
| 99 | 99 | 49500–49999 | 500 | 30.12 (59.94 × 400/797) | 796 | 49500 | 73755 (400) + 73756 (396) |
| 100 | 100 | 50000–50499 | 500 | 29.97 (59.94 × 400/800) | 800 | 5000 | 74750 (400) + 74751 (400) |

In Table 4, "CB" includes 101 blocks, i.e., CBO to CB100, and "SB" also includes 101 blocks, i.e., SBO to SB100. "Track Number" and "Number of Tracks" indicate the track numbers and the number of tracks in each block. "Disk Rotational Speed" indicates rotational speeds proportional to recording frame amounts. For example, if the shortest recording wave length is about 0.3 μm, the disk rotational speed for writing (4 m+400) HFs in a clock block m is given as follows:

in *CB*0: *HF* frequency × 400/400 = 59.94 rps in *CB*1: *HF* frequency × 400/404 = 59.35 rps

⋮ in *CBn*: *HF* frequency × 400/[4*m* + 400]

⋮ in *CB*100: *HF* frequency × 400/800 = 29.97 rps

Table 4 also shows the number of recording SBs per track in each CB, the track number of the start track of 500 tracks in each CB, and the HF number and number of recording SBs of a recording HF in the start track. For example, 500 tracks corresponding to track numbers 1000 to 1499 are defined as CB2 and SB2 and are rotated at a rotational speed of 58.76 rps. Assume that 408-SB data is recorded on each track of the 500 tracks, and 400 SBs of the 1005th HF and the first 8 SBs of the 1006th HF are recorded on the 1st track corresponding to track number 1000. Although not described, it is apparent that the remaining 392 SBs of the 1006th HF and the first 16 SBs of the 1007th HF are recorded at track number 1001, and a recording operation is subsequently performed in the same manner as described above.

In Table 4, if t is the track number and m=Int(t/500), the recording HF number and the number of recording SBs (indicated by a mark "*") corresponding to a track number are given by the following mathematical expressions:

*HF* Number — Number of *SBs* (4)

$$t + Int\left[\frac{tm - 250m(m+1)}{100}\right] \qquad \begin{bmatrix} 400 & ; t < 500 \\ 400 + 4m - W & ; t \geqq 500 \text{ and } W \leqq 400 \\ 400 + 4m - W & ; t \geqq 500 \text{ and } W > 400 \end{bmatrix}$$

$$t + Int\left[\frac{tm - 250m(m+1)}{100}\right] + 1 \qquad \begin{bmatrix} 0 & ; t < 500 \\ W & ; t \geqq 500 \text{ and } W \leqq 400 \\ 400 & ; t \geqq 500 \text{ and } W > 400 \end{bmatrix}$$

$$t + Int\left[\frac{tm - 250m(m+1)}{100}\right] + 2 \qquad \begin{bmatrix} 0 & ; t < 500 \\ 0 & ; t \geqq 500 \text{ and } W \leqq 400 \\ W - 400 & ; t \geqq 500 \text{ and } W > 400 \end{bmatrix}$$

-continued $$\text{for } W = 4m\left[t - \frac{100}{m}\cdot Int\frac{(t-500m)m}{100} - 500m + 1\right]$$

These mathematical expressions (4) are rewritten into general mathematical expressions, and data block numbers DB indicating data blocks to be recorded and numbers SB of recording sync blocks in the data blocks are given by $$DB0 = t + Int\left[\frac{tm - Tm(m+1)/2}{D/B}\right] \qquad SB0 = \begin{cases} D & ; t < T \\ D + Bm - W & ; t \geqq T \text{ and } W \leqq D \\ D + Bm - W & ; t \geqq T \text{ and } W > D \end{cases} \tag{5}$$

$$DB1 = t + Int\left[\frac{tm - Tm(m+1)/2}{D/B}\right] + 1 \qquad SB1 = \begin{cases} 0 & ; t < T \\ W & ; t \geqq T \text{and } W \leqq D \\ D & ; t \geqq T \text{and } W > D \end{cases}$$

$$DB2 = t + Int\left[\frac{tm - Tm(m+1)/2}{D/B}\right] + 2 \qquad SB2 = \begin{cases} 0 & ; t < T \\ 0 & ; t \geqq T \text{ and } W \leqq D \\ W - D & ; T \text{ and } W > D \end{cases}$$

$$\text{for } W = Bm\left[t - \frac{D/B}{m}\cdot Int\frac{(t-Tm)m}{D/B} - Tm + 1\right]$$

where t is the track number, T is the number of tracks per area, m=Int(t/T) is the area number, (A+mB) is the number of write sync blocks in an mth area, and D is the number of sync blocks per data block.

FIG. 5 shows recording tracks with a constant recording clock frequency of 38 MHz (NRZ).

At track number 0 (CB0), a recording operation is started from a position corresponding to a diameter of 0.06 m. In this case, the rotational speed is 59.94 rps, and the shortest recording wave length can be calculated to be 0.297 μm, as shown in FIG. 5. A time residue and jitter in each track are absorbed during a track jump gap (TJ) period. If a track address (TA) is 150 μsec, the track jump gap TJ is 365 μsec, as shown in FIG. 5. At each of track numbers 1 to 499, values can be calculated in the same manner as described above.

At track number 500 (CB1), a recording operation is started from a position corresponding to a diameter of 0.0606 m. In this case, the rotational speed is 59.35 rps and the shortest recording wave length is 0.297 μm. The track jump gap TJ is 369 sec.

At track number 1000 (CB2), a recording operation is started from a position corresponding to a diameter of 0.0612 m. In this case, the rotational speed is 58.76 rps and the shortest recording wave length is 0.297. The track jump gap TJ is 376 sec.

At last track number 5000 (CB100), a recording operation is started from a position corresponding to a diameter of 0.12 m. In this case, the rotational speed is 29.97 rps and the shortest recording wave length is 0.297 μm. The track jump gap TJ is 880 sec.

FIGS. 6A to 6L show timing charts.

"HF synchronization" (FIG. 6A) is kept at 59.94 Hz, and input HF numbers (FIG. 6B) and input numbers of SBs (FIG. 6C) are subjected to data division according to a predetermined track distribution method. The period of "track processing" (FIG. 6D) is determined in accordance with the number of SBs of data to be processed on each track. "HF number 1" (and "number of SBs") (FIG. 6E), "HF number 2" (and "number of SBs") (FIG. 6F), and "number of SBs" (FIG. 6G) indicate the timing at which data input from each track is written in a buffer memory. "Track synchronization" (FIG. 6H) indicates the recording timing of each track and a reference for disk spindle servo control. "Write HF number 1" (and "number of SBs") (FIG. 6I), and write HF number 2 (and "number of SBs") (FIG. 6J) indicate the HF numbers and number of SBs of data read out from the buffer memory (recording data memory 107) and recorded on the disk. "Track number" (FIG. 6K) indicates write track numbers. "Track synchronization period" (FIG. 6L) indicates a value which is multiplied by 1/(59.94×400) to indicate the time required for one revolution of the disk. In each CB, the time required for one revolution of the disk, i.e., the disk rotational speed, is fixed to one value.

As described above, a constant recording clock frequency of 38 Mbps (NRZ) is set, the disk rotational speed is set to be 59.94 to 29.97 rps, and the shortest recording wave length is set to be 0.297 μm, thereby realizing a recording scheme with a fixed recording clock, variable disk rotational speeds, and a constant shortest recording wave length.

Since the number of recording HFs is 75,750, and the number of recording frames is 37,875, the total recording time is given by $$37875/(29.97\times60)=21.06\ (\text{min})$$

A data recording method for an optical disk apparatus according to still another embodiment of the present invention will be described next with reference to FIGS. 7 and 8A to 8L.

A control scheme which changes the rotational speed more smoothly than the rotational speed clock block control scheme is called "rotational speed servo block control scheme". In the rotational speed servo block control scheme, a plurality of SBs are present in one CB.

TABLE 5

| | | | | | | Recording HF | |
|---|---|---|---|---|---|---|---|
| CB | SB | Track Number | Number of Tracks | Disk Rotational Speed [rps] (Arithmetic Expression) | Number of SBs per Track | Start Track | Recording HF Number (Number of SBs) |
| 0 | 0 | 0–63 | 84 | 60.24 (59.94 × 400/398) | 400 | 0 | 0 (400) |
| | 1 | 64–187 | 124 | 60.09 (59.94 × 400/399) | | 64 | 64 (400) |
| | 2 | 188–311 | 124 | 59.94 (59.94 × 400/400) | | 188 | 188 (400) |
| | 3 | 312–435 | 124 | 59.79 (59.94 × 400/401) | | 312 | 312 (400) |
| | 4 | 436–499 | 64 | 59.64 (59.94 × 400/402) | | 436 | 436 (400) |
| 1 | 4 | 500–563 | 64 | 59.64 (59.94 × 400/402) | 404 | 500 | 500 (400) + 501 (14) |
| | 5 | 564–687 | 124 | 59.49 (59.94 × 400/403) | | 564 | 564 (144) + 565 (260) |
| | 6 | 688–811 | 124 | 59.35 (59.94 × 400/404) | | 688 | 689 (48) + 690 (356) |
| | 7 | 812–935 | 124 | 59.20 (59.94 × 400/405) | | 812 | 815 (352) + 316 (52) |
| | 8 | 936–999 | 64 | 59.05 (59.94 × 400/406) | | 936 | 940 (256) + 941 (148) |
| . . . | | | | | | | |
| m | 4m | 500m–500m + 63 | 64 | (59.94 × 400)/(4m + 398) | 4m + 400 | 500m | * |
| | 4m + 1 | 500m + 64–500m + 187 | 124 | (59.94 × 400)/(4m + 399) | | 500m + 64 | |
| | 4m + 2 | 500m + 188–500m + 311 | 124 | (59.94 × 400)/(4m + 400) | | 500m + 188 | |
| | 4m + 3 | 500m + 312–500m + 435 | 124 | (59.94 × 400)/(4m + 401) | | 500m + 312 | |
| | 4m + 4 | 500m + 436–500m + 499 | 64 | (59.94 × 400)/(4m + 402) | | 500m + 436 | |
| . . . | | | | | | | |
| 100 | 400 | 50000–50063 | 64 | 30.05 (59.94 × 400/798) | | 50000 | 74750 (400) + 74751 (400) |
| | 401 | 50064–50187 | 124 | 30.01 (59.94 × 400/799) | | 50064 | 74878 (400) + 74879 (400) |
| | 402 | 50188–50311 | 124 | 29.97 (59.94 × 400/800) | | 50188 | 75126 (400) + 75127 (400) |
| | 403 | 50312–50435 | 124 | 29.93 (59.94 × 400/801) | | 50312 | 75374 (400) + 75376 (400) |
| | 404 | 50436–50499 | 64 | 29.90 (59.94 × 400/802) | | 50436 | 75622 (400) + 75623 (400) |

In Table 5, in CB0, 400 SBs are recorded per track on average, and in CB1, 404 SBs are recorded per track on average. In this case, the rotational speeds capable of recording 401, 402, and 403 SBs are present between the rotational speeds capable of recording 400 and 404 SBs. First of all, with regards to the value of 125 obtained by dividing 500 tracks by 4, 124 is set in consideration of the boundary between clock blocks, and the rotational speeds for 124 tracks (SB2) located in the middle of CB0 and 124 tracks (SB6) located in the middle of CB1 are respectively set as follows:

59.94×400/400 rps; 59.94×400/404 rps

The rotational speeds for the tracks between the above two groups of tracks, i.e., the 124 tracks (SB3) and the 64 tracks (SB4) following SB2 in CB0, and the first 64 tracks (SB4) and the 124 tracks (SB5) in CB1 are respectively set as follows:

59.94×400/401 rps; 59,94×400/402 rps;

59.94×400/402 rps; 59.94×400/403 rps

With this operation, as the average rotational speeds for CB0 and CB1, 59.94×400/400 rps and 59.94×400/404 rps are respectively obtained. Subsequently, tracks are formed into groups, and rotational speeds are respectively assigned thereto, thereby obtaining disk rotational speeds which smoothly change in 405 steps from SB0 to SB404.

Note that the values of 64, 124, 124, 124, and 64, each of which indicates the number of tracks per SB in each CB, may be variously changed as long as the average disk rotational speed per CB is set to be a predetermined value. For example, in CBO, if the numbers of tracks in SB0, SB1, SB2, SB3, and SB4 are respectively set to be 60, 120, 140, 120, and 60, no problem is posed because the average rotational speed is 59.94×400/400 rps.

Letting V be the HF frequency (59.94 Hz), A be the number (400) of SBs per track in CB0, B be the number (4) of SBs increased per track with an increase in CB number, K be number of SBs=5 in CBm, and P be the SB number in CBm, the disk rotational speed for CBm can be given by $VA/\{(A+B(n-½)+BP/(K-1)\}$. For example, SB9 is the 1st SB in CB2 when counted from SBO, i.e., P=1. Therefore, the rotational speed for SB9 is $$59.94.400/\{400+4(2-½)+4\cdot 1/(5-1)\}=58.91 \text{ Hz}$$

In another servo block division method, rotational speeds may be set as follows. In CBO, the tracks are grouped into SB0 to SB3, each consisting of 125 tracks, and rotational speeds for the respective groups are set as follows:

59.94×400/398.5 rps; 59.94×400/399.5 rps 59.94×400/400.5 rps; 59.94×400/401.5 rps In CB1, the tracks are grouped into SB4 to SB7, each consisting of 125 tracks, and rotational speeds for the respective groups are set as follows:

59.94×400/402.5 rps; 59.94×400/403.5 rps 59.94×400/404.5 rps; 59.94×400/405.5 rps According to this method, as the average rotational speeds for CB0 and CB1, 59.94×400/400 rps and 59.94×400/404 rps are respectively obtained. Subsequently, the denominator is increased one by one with an increase in the SB number, and the resultant rotational speeds are assigned to the respective SBs, thereby obtaining disk rotational speeds which smoothly change in 404 steps from SB0 to SB403.

Assume that values V, A, and B are set in the same manner as described above. Also assume that K is the number of SBs=4 in CBm, and P is the SB number in CBm. In this case, the disk rotational speed for CBm can be given by VA/{A+B(m−½)+B(P+½)/K}. For example, SB6 is the second SB in CB1 when counted from SB0, i.e., P=2. Therefore, the rotational speed for SB6 is 59.94·400/{400+4(1−½)+4(2+½)/4}=59.27 rps In any case, it is important that the disk rotational speed be set to a predetermined value. Any servo block control method may be used as long as this requirement is satisfied.

In Table 5, the track numbers, the numbers of tracks, and the disk rotational speeds are determined on the basis of the above-described method.

Table 5 also Shows the number of recording SBs per track in each CB, and the track number of the 1st track in each SB, the HF number and number of SBs of the recording HF of the 1st track in each CB.

The values indicated by a mark "*" in Table 5 can be obtained by mathematical expressions (4) in the same manner as described above.

FIG. 7 shows recording tracks with a recording clock frequency of 38 MHz (NRZ). At track number 0 (CBO; SBO), a recording operation is started from a position corresponding to a diameter of 0.06 m. In this case, the rotational speed is 60.24 rps, and the shortest recording wave length can be calculated to be 0.299 μm, as shown in FIG. 7. In addition, a time residue and jitter in each track are absorbed during a TJ period. If the TA is 150 μsec, the TJ is 282 μsec, as shown in FIG. 7. At each of track numbers 1 to 63, values can be calculated in the same manner as described above.

Similarly, at track numbers 64, 188, 312, and 436 (CB0; SB1 to SB4), recording operations are respectively started from positions corresponding to diameters of 0.0600768 m, 0.0602256 m, 0.0603744 m, and 0.0605232 m. In this case, the rotational speeds are 60.09 rps, 59.94 rps, 59.79 rps, and 59.64 rps, and the shortest recording wave length at all the track numbers is 0.298 m. If the TA is 150 μsec, the TJ is set to be 324 μsec, 365 μsec, 407 μsec, and 449 μsec. Subsequently, the above values can be calculated up to track number 499 in the same manner described above.

At track numbers 500, 564, 688, 812, and 936 (CB1; SB4 to SB8), recording operations are respectively started from positions corresponding to diameters of 0.606 m, 0.0606768 m, 0.0608256 m, 0.0609744 m, and 0.0611232 m. In this case, the rotational speeds are 59.64 rps, 59.49 rps, 59.35 rps, 59.20 rps, and 59.05 rps, and the shortest recording wave lengths at all the track numbers range from 0.299 μm to 0.298 μm. In addition, if the TA is 150 μsec, the TJ is set to be 287 μsec, 330 μsec, 369 μsec, 412 μsec, and 455 μsec at the respective track numbers.

Similarly, at track numbers 50000, 50064, 50188, 50312, and 50436 (CB100; SB400 to SB404), recording operations are respectively started from positions corresponding to diameters of 0.12 m, 0.1200768 m, 0.1202256 m, 0.1203744 m, and 0.1205232 m. In this case, the rotational speeds are 30.05 rps, 30.01 rps, 29.97 rps, 29.93 rps, and 29.90 rps, and the shortest recording wave length at all the track numbers is 0.298 μm. In addition, if the TA is 150 μsec, the TJ is set to be 791 μsec, 835 μsec, 880 μsec, 924 μsec, and 958 μsec at the respective track numbers. Values can be calculated up to track number 50499 in the same manner described above.

FIGS. 8A to 8L show timing charts.

"HF synchronization" (FIG. 8A) is kept at 59.94 Hz, and input HF numbers (FIG. 8B) and input numbers of SBs (FIG. 8C) are subjected to data division according to a predetermined track distribution method. The period of "track processing" (FIG. 8D) is determined in accordance with the number of SBs of data to be processed on each track. "HF number 1" (and "number of SBs") (FIG. 8E), "HF number 2" (and "number of SBs") (FIG. 8F), and "number of SBs" (FIG. 8G) indicate the timing at which data input from each track is written in a buffer memory. "Track synchronization" (FIG. 8H) indicates the recording timing of each track and a reference for disk spindle servo control. "Write HF number 1" (and "number of SBs") (FIG. 8I), and write HF number 2 (and "number of SBs") (FIG. 8J) indicate the HF numbers and number of SBs of data read out from the buffer memory and recorded on the disk. "Track number" (FIG. 8K) indicates write track numbers. "Track synchronization period" (FIG. 8L) indicates a value which is multiplied by 1/(59.94×400) to indicate the time required for one revolution of the disk. In each CB, the time required for one revolution of the disk, i.e., the disk rotational speed, is fixed to one value.

As described above, a constant recording clock frequency of 38 Mbps (NRZ) is set, the disk rotational speed is set to be 60.24 to 29.90 rps, and the shortest recording wave length is set to be 0.298 μm, thereby realizing a recording scheme with a fixed recording clock, variable disk rotational speeds, and a constant shortest recording wave length.

As described above, since the number of recording HFs is 75,750, and the number of recording frames is 37,875, the total recording time is given by 37875/(29.97×60)=21.06 (min)

A data reproduction method for an optical disk apparatus according to an embodiment of the present invention will be described next with reference to FIGS. 9A to 9E 9A' to 9E' and 9A" to 9E".

Assume that a constant disk rotational speed of 59.94 rps is set in the reproduction mode. Also assume that the reproduction clock frequency changes with a change in CB number, and tracks are regenerated by a phased-locked loop circuit (PLL) on the basis of a CB and a clock frequency estimated from the position of the optical head.

Figures 9A, 9B, 9C, 9D, 9E:
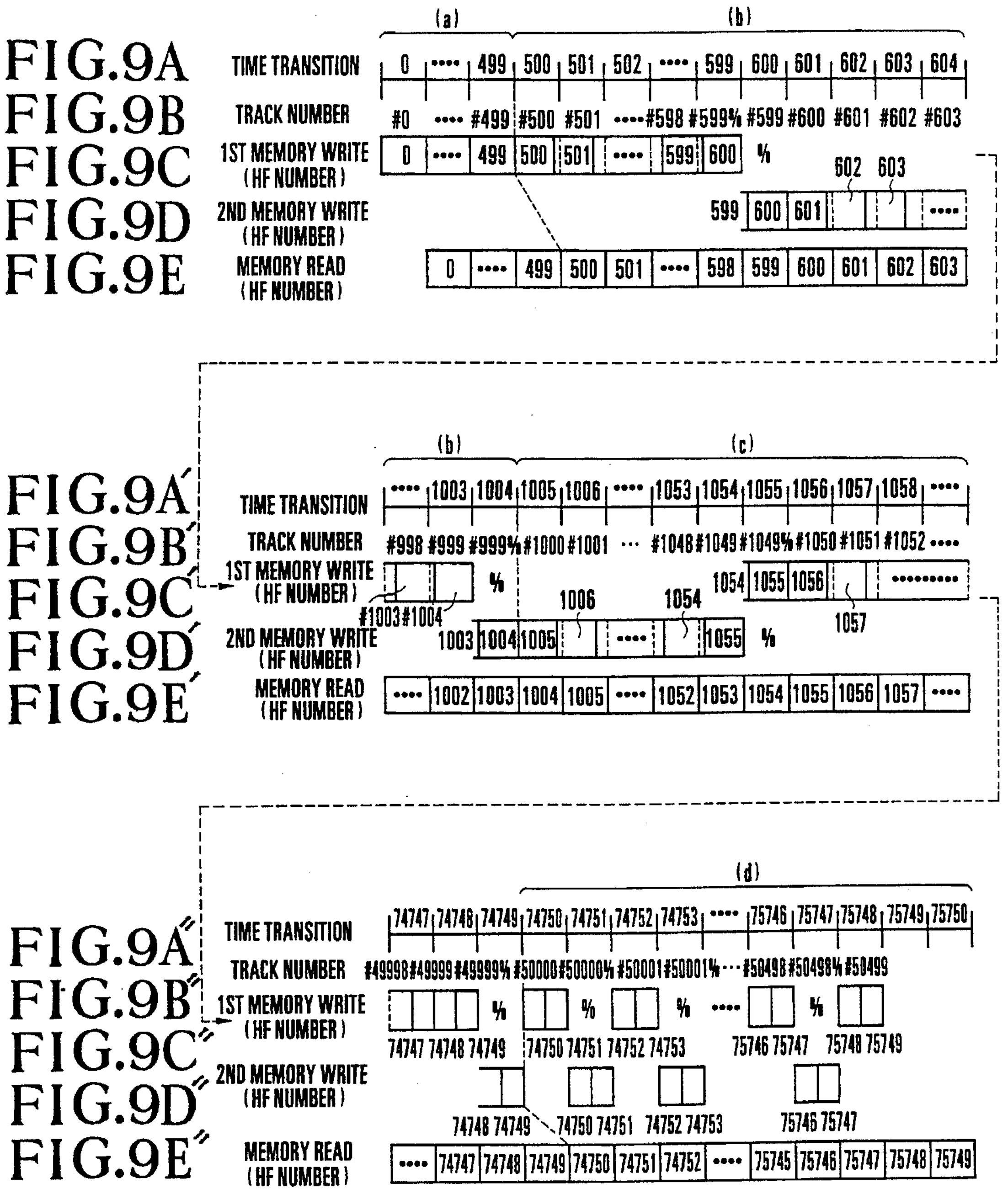
FIGS. 9A to 9E, 9A'-9E' and 9A"-9E" are timing charts for explaining a reproducing operation.
Figure 10:
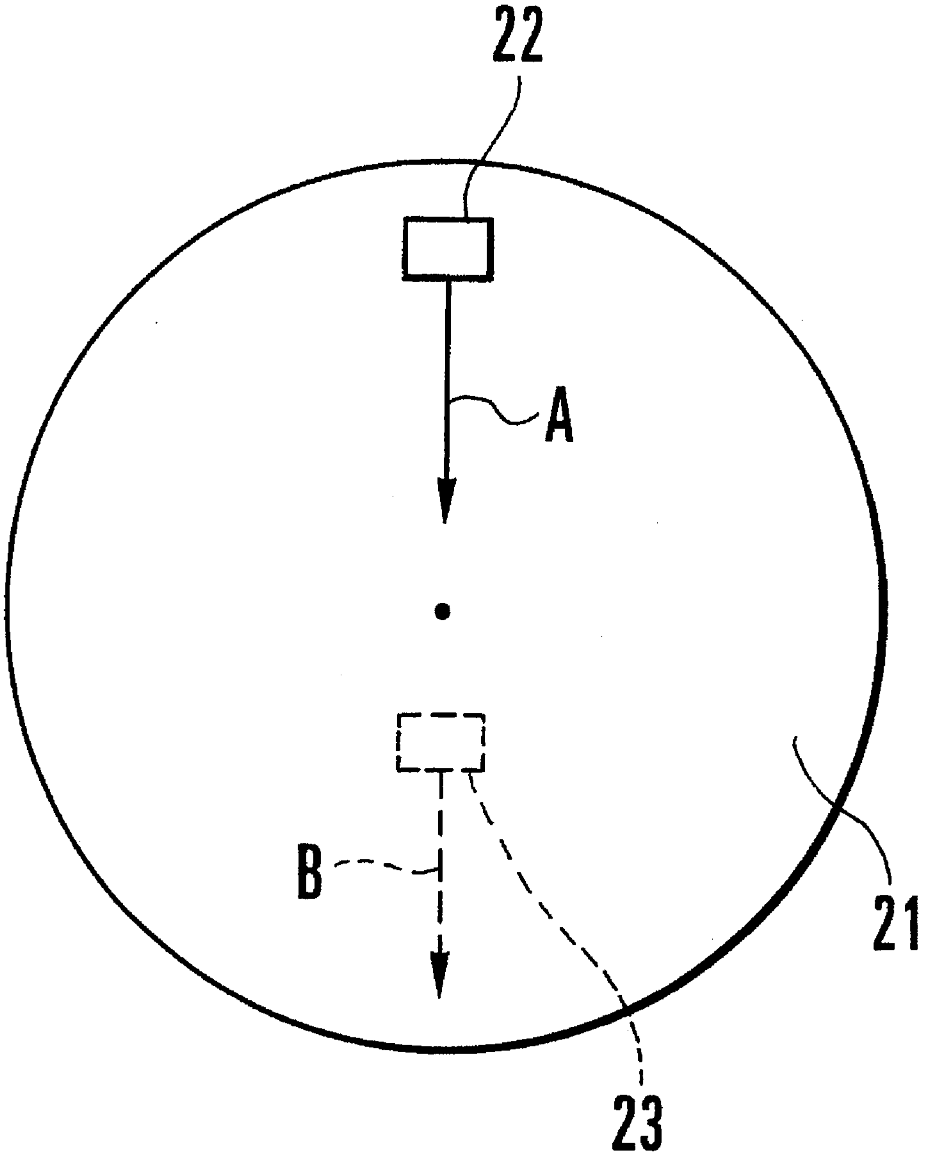
FIG. 10 is a view showing the positions of optical heads in a conventional optical disk apparatus.
Figure 11:
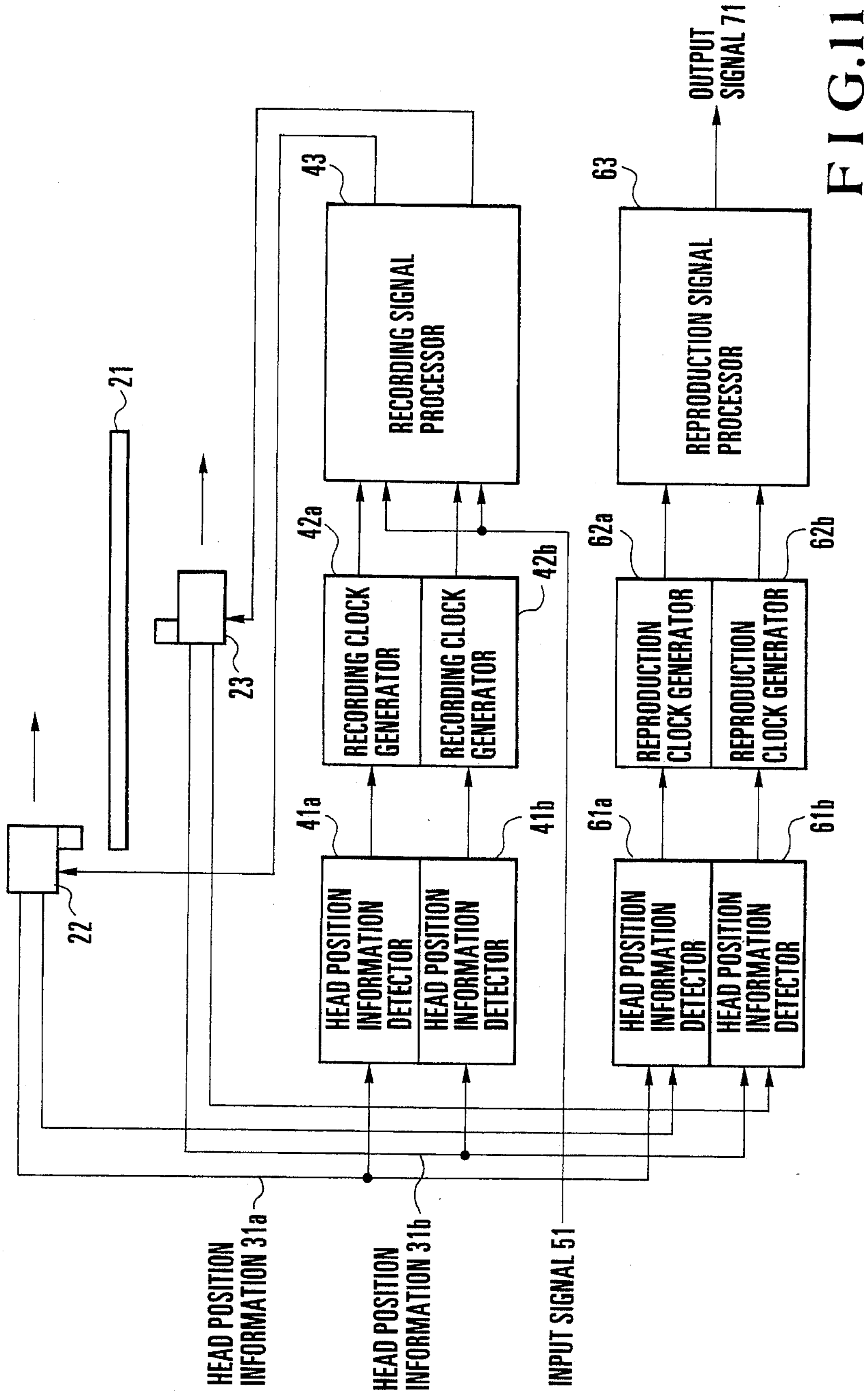
FIG. 11 is a block diagram showing a conventional optical disk apparatus.

FIGS 9A, 9A' and 9A" show time transition. FIGS. 9B, 9B' and 9B" show; FIGS. 9C, 9C' and 9C" a data read timing. FIGS. 9D, 9D' and 9D" show track numbers. FIGS. 9E, 9E' and 9E" show a reproduction signal processing timing.

In a timer interval (a), in CBO, 500-HF data are read from 500 tracks corresponding to track numbers 0 to 499 as in a normal operation.

In a time interval (b), in CB1, a normal read operation is performed from track number 500 to track number 599. Upon completion of this operation, a track jump is performed to return the optical head position by one track, as indicated by a mark "%", so as to read data from track number 599% again. In this case, the track having track number 599 is called "repeat track". A repeat track is generated every time a cumulative value TB of differences between an amount (A+TB) of data read from the Tth track and an amount (A) of data output from the system per track, reaches the data amount A. Subsequently, as shown in FIGS. 9A to 9E and 9A' to 9E', repeat tracks are generated at a total of five tracks corresponding to track numbers 699, 799, 899, and 999.

In a time interval (c), in CB2, repeat tracks are generated at a total of 10 tracks corresponding to track numbers 1049, 1099, 1149, . . . , 1499.

In CB3, repeat tracks are generated at a total of 15 tracks. In CBn, repeat tracks are generated at a total of 5n tracks.

Subsequently, in a time interval (d), in last CB100, repeat tracks are generated at 499 tracks excluding the last one track. All the read data are written in the reproduction data memory 110.

After this operation, reproduction signal processing is performed. A reproduction signal processor is constituted by a sync signal detection/demodulation circuit, an error correction/modification circuit, a deshuffling circuit, a video/audio separation circuit, and the like (none of which are shown). The reproduction signal processor processes data, read out from the reproduction data memory 110, in units of HFs at equal time intervals.

As has been described above, according to the present invention, the storage area of an optical disk is divided into n+1 equal areas (n is an integer satisfying $n \geqq 1$) in the radial direction so as to set track areas from the 0th track on the innermost periphery to the nth track on the outermost periphery. The amount of recording data per track in the 0th track area is represented by A. Every time the optical head moves to the next track area, the data amount is increased by $\Delta A$. The data amounts A and $\Delta A$ are set such that the ratio between the track diameter of the mth track area (m is an integer satisfying $n \geqq m \geqq 0$) and $(A+\Delta A \cdot m)$ is made as constant as possible. With this operation, recording data can be recorded on an optical disk, which is rotated at a constant angular velocity, with an almost constant recording wave length by using one optical head without using an optical disk having recordable upper and lower surfaces and two optical heads.

Assume that recording data processing such as video/audio synthesis and addition of an error correction code is performed with respect to recording input data to generate recording data for the mth track area. In this case, the recording data processing is performed at the rate of the data amount A in a one-track period, and the resultant data is temporarily written in the recording data memory. Thereafter, the data is read out at the recording data rate to generate recording data. In this case, every time the cumulative value of differences between the data amount A and data amount $(A+\Delta A \cdot m)$ reaches the data amount A, reading and recording of data from and on the recording data memory and the optical disk are interrupted for a one-track period, thereby matching the recording data processing rate with the recording data rate.

Assume also that predetermined reproduction data processing such as error correction and video/audio separation is performed with respect to reproduction data read out from the mth track area to generate reproduction data. In this case, the reproduction data is temporarily written in the reproduction data memory at a reproduction data rate. Thereafter, the data is read out at the rate of the data amount A in a one-track period, and predetermined reproduction processing of the read data is performed to generate reproduction output data. In this case, every time the cumulative value of differences between the data amount A and the data amount $(A+\Delta A \cdot m)$ reaches the data amount A, the optical head is returned by one track to read reproduction data from the optical disk again, thereby matching the reproduction data processing rate with the reproduction data rate.

In addition, the recording area of an optical or magnetooptical disk is divided into n equal areas in the track direction. Data corresponding to A sync blocks are written per track in the 0th area on the innermost periphery of the recording area. Data corresponding to (A+mB) sync blocks are written per track in the mth area. In the subsequent areas, data are written in the same manner as described above. Finally, in the nth area on the outermost periphery, data corresponding to (A+nB) sync blocks are written per track. The values A and B are set such that a value obtained by dividing the disk diameter in the mth area by (A+mB) is made as constant as possible. Let T be the number of tracks in the mth area, and (A+mB) be the number of write sync blocks per track. This area is further divided into K sub-areas (K is an integer), i.e., sub-area 0 to sub-area (K−1). Let V be the average disk rotational speed set for a write or read operation with respect to the 0th area. In this case, a rotational speed for the 0th sub-area in the nth area is given by $VA/\{A+B(m-\frac{1}{2})+B/2K\}$; a rotational speed for the Pth sub-area in the mth area, by $VA/\{A+B(m-\frac{1}{2})+B(P+\frac{1}{2})/K\}$; and a rotational speed for the (K−1)th sub-area in the mth area, by $VA/\{A+B(m+\frac{1}{2})-B/2K\}$. The sub-area are set such that an average rotational speed for the mth area is given by VA/(A+mB). With this operation, the disk rotational speed is controlled to allow recording/reproduction of user data and video/audio data with one head, a constant recording wave length, and a constant recording/reproduction clock frequency. When data is recorded by the above method and reproduced with a constant disk rotational speed and variable reproduction clock frequencies, a high-density recording operation and a high-speed search can be realized.

What is claimed is:

1. An optical disk apparatus comprising:

an optical storage medium rotated at a constant angular velocity, said optical storage medium having a storage area constituted by track areas ranging from a 0th area on an innermost periphery to an nth area on an outermost periphery of the storage area, and the track areas being set by dividing the storage area into (n+1) equal areas (n is an integer satisfying $n \geqq 1$) in a radial direction;

an optical head for optically recording and reproducing recording data on and from said optical storage medium with a constant wave length;

head drive control means for driving/controlling said optical head; and data generating means for generating recording data such that a data amount is increased by $\Delta A$ (A is the amount of recording data per track when said optical head is located in the 0th track area) every time said optical head moves to a next track area, and outputting the recording data to said optical head, wherein the recording data amount A and the increase $\Delta A$ are set such that a ratio between a track diameter in an mth track area (m is an integer satisfying $n \geqq m \geqq 0$) and a recording data amount $(A+\Delta A \times m)$ is made substantially constant.

2. An apparatus according to claim 1, wherein said data generating means comprises a recording data memory for storing recording data recorded on said optical storage medium, and recording data processing means for performing predetermined recording data processing including video/audio synthesis and error code correction with respect to recording input data, temporarily writing the resultant data in said recording data memory, reading out the recording data from said recording data memory in units of tracks at a predetermined rate, and outputting the readout data to said optical head.

3. An apparatus according to claim 2, wherein said recording data processing means temporarily stores, in said data memory, recording input data obtained by performing recording data processing at a rate at which the recording data amount A can be processed in a one-track period, reads out the recording data from said data memory at a rate at which the recording data amount (A+ΔA×m) can be recorded in a one-track period, outputs the readout data to said optical head, and stops reading the recording data from said recording data memory for a one-track period as a pause track every time a cumulative value of differences between the recording data amount A and the recording data amount (A+ ΔA×m) reaches the data amount A so as to interrupt the recording operation of said optical head.

4. An apparatus according to claim 3, wherein said head drive control means returns said optical head by one track at the end of the pause track, and resumes the interrupted data recording operation from a track immediately before the track in which the pause track has occurred.

5. An apparatus according to claim 3, further comprising a reproduction data memory for storing reproduction data read out from said optical storage medium, and reproduction data processing means for temporarily writing reproduction data, read by said optical head, in said reproduction data memory at a rate at which the data amount (A+ΔA×m) is reproduced, performing predetermined reproduction data processing including error correction and video/audio separation with respect to the reproduction data, and outputting the resultant data as reproduction output data, and wherein said head drive control means returns said optical head by one track every time a cumulative value of differences between the data mount A and the data amount (A+ΔA×m) reaches the data amount A, and said optical head resumes an output operation from reproduction data in a track immediately before the track in which the pause track has occurred.

6. An apparatus according to claim 5, further comprising track position detecting means for receiving position information from said optical head and outputting a track position signal indicating a position of a track, recording control signal generating means for outputting a recording clock signal to said recording data processing means on the basis of the track position signal from said track position detecting means, and also outputting a pause track control signal for designating a pause track to said recording data processing means and said head drive control means, and reproduction control signal generating means for outputting a reproduction clock signal to said reproduction data processing means on the basis of the track position signal from said track position detecting means, and also outputting a repeat track control signal for designating a repeat track to said reproduction data processing means and said head drive control means, and wherein said data processing means reads out recording data from said recording data memory on the basis of the recording clock signal and the pause track control signal from said recording control signal generating means, said reproduction data processing means writes reproduction data from said optical head in said reproduction data memory on the basis of the reproduction clock signal and the repeat track signal from said reproduction control signal generating means, and said head drive control means drives/controls said optical head on the basis of the pause track control signal from said recording control signal generating means and the repeat track control signal from said reproduction control signal generating means.

7. An apparatus according to claim 1, wherein each of the 0th to nth track areas comprises a predetermined number of tracks, and said data generating means generates recording data of the same data amount (A+ΔA×m) in each track in the same track area.

8. An optical disk apparatus comprising:

an optical storage medium rotated at a constant angular velocity, said optical storage medium having a storage area constituted by track areas ranging from a 0th area on an innermost periphery to an nth area on an outermost periphery of the storage area, and the track areas being set by dividing the storage area into (n+1) equal areas (n is an integer satisfying n≧1) in a radial direction;

an optical head for optically recording and reproducing recording data on and from said optical storage medium with a constant wave length;

head drive control means for driving/controlling said optical head; and data generating means for generating recording data such that a data amount is decreased by ΔB (B is the amount of recording data per track when said optical head is located in the nth track area) every time said optical head moves to a next track area, and outputting the recording data to said optical head, wherein the recording data amount and the decrease ΔB are set such that a ratio between a track diameter in an mth track area (m is an integer satisfying n≧m≧0) and a recording data amount (B+ΔB×m) is made substantially constant.

9. A recording method for an optical disk apparatus, comprising the steps of:

dividing a storage area of an optical storage medium into (n+1) equal areas (n is an integer satisfying n≧1) in a track direction;

writing data corresponding to sync blocks per track in a 0th area as an innermost area, the sync block consisting of a data string including a sync signal, an ID signal, data, and an error correction code;

writing data corresponding to (A+B) sync blocks per track in a 1st area;

writing data corresponding to (A+m×B) sync blocks per track in an mth area (m is an integer satisfying n≧m≧0); and setting values A and B such that a ratio between a track diameter in the mth area and the (A+m×B) sync blocks is made substantially constant.

10. A method according to claim 9, wherein data block numbers DB indicating data blocks to be recorded and numbers SB of recording sync blocks in the data blocks are given by $$DB0 = t + Int\left[\frac{tm - Tm(m+1)/2}{D/B}\right] \qquad SB0 = \begin{cases} D & ; t < T \\ D + Bm - W & ; t \geqq T \text{ and } W \leqq D \\ D + Bm - W & ; t \geqq T \text{ and } W > D \end{cases}$$

$$DB1 = t + Int\left[\frac{tm - Tm(m+1)/2}{D/B}\right] + 1 \qquad SB1 = \begin{cases} 0 & ; t < T \\ W & ; t \geqq T \text{ and } W \leqq D \\ D & ; t \geqq T \text{ and } W > D \end{cases}$$

$$DB2 = t + Int\left[\frac{tm - Tm(m+1)/2}{D/B}\right] + 2 \qquad SB2 = \begin{cases} 0 & ; t < T \\ 0 & ; t \geqq T \text{ and } W \leqq D \\ W - D & ; T \text{ and } W > D \end{cases}$$

$$\text{for } W = Bm\left[t - \frac{D/B}{m} \cdot Int\frac{(t - Tm)m}{D/B} - Tm + 1\right]$$

where t is a track number, T is the number of tracks per area, m=Int(t/T) is an area number, (A+mB) is the number of write sync blocks in an mth area, and D is the number of sync blocks per data block.

11. A method according to claim 9, wherein, when a disk rotational speed for a read/write operation with respect to the 0th area is represented by V, a disk rotational speed for a write/read operation with respect to the 1st area is set as VA/(A+B), a disk rotational speed for a write/read operation with respect to the mth area is set as VA/(A+mB), and a recording/reproducing operation is performed while making a recording/reproduction clock frequency constant.

12. A method according to claim 9, wherein, when the number of tracks in each area is set as T, and a disk rotational speed for a write/read operation with respect to the (K–1)/2th sub-area (K is an integer) of K sub-areas obtained by dividing each area and constituted by 0th to (k–1)th sub-areas is set as V, a rotational speed for the 0th sub-area in the 0th area is set as VA/(A–B/2), a rotational speed for the Pth sub-area in the 0th area is set as VA/{A–B/2+BP/(K–1)}, and a rotational speed for the (K–1)th sub-area in the 0th area is set as VA/(A+B/2), thereby setting the sub-areas to set the rotational speed V as an average rotational speed for the 0th area, a rotational speed for the 0th sub-area in the 1st area is set as VA/(A+B/2), a rotational speed for the Pth sub-area in the 1st area is set as VA/{/A+B/2+BP/(K–1), and a rotational speed for the (K–1)th sub-area in the 1st area is set as VA/(A+3B/2), thereby setting the sub-areas to set the rotational speed VA/(A+B) as an average rotational speed for the 1st area, a rotational speed for the 0th sub-area in the mth area is set as VA/(A+B(m–½)), a rotational speed for the Pth sub-area in the mth area is set as VA/{A+B(m–½)+BP/(K–1)}, and a rotational speed for the (K–1)th sub-area in the mth area is set as VA/{A+B(m+½)}, thereby setting the sub-areas to set the rotational speed VA/(A+mB) as an average rotational speed for the mth area, and a recording/reproducing operation is performed while making a constant recording/reproduction clock frequency constant.

13. A method according to claim 9, wherein, when the number of tracks in each area is set as T, and an average disk rotational speed for a write/read operation with respect to the 0th area of (K+1) sub-areas (K is an integer) obtained by dividing each area and constituted by 0th to (K–1)th sub-areas is set as V, a rotational speed for 0th sub-area in the 0th area is set as VA/(A–B/2+B/2K), a rotational speed for the Pth sub-area in the 0th area is set as VA/{A–B/ 2+B(P+½)/K}, and a rotational speed for the (K–1)th sub-area in the 0th area is set as VA/(A+B/2–B/2K), a rotational speed for the 0th sub-area in the 1st area is set as VA/(A+B/2+B/2K), a rotational speed for the Pth sub-area in the 1st area is set as VA/{A+B/2+B(P+½)/K}, and a rotational speed for the (K–1)th sub-area in the 1st area is set as VA/{A+3B/2–B/2K}, thereby setting the sub-areas to set the rotational speed VA/(A+B) as an average rotational speed for the 1st area, a rotational speed for the 0th sub-area in the mth area is set as VA/{A+B(m–½)+B/2}, a rotational speed for the Pth sub-area in the mth area is set as VA/{A+B(m–½)+B(P+½)/K}, and a rotational speed for the (K–1)th sub-area in the mth area is set as VA/{A+B(m+½)–B/2K}, thereby setting the sub-areas to set the rotational speed VA/(A+mB) as an average rotational speed for the nth area, and a recording/reproducing operation is performed while making a recording/reproduction clock frequency constant.

14. A method according to claim 9, wherein a recording signal in one track has a track address and a track jump gap in addition to data, the track address occupies a predetermined period of time throughout all tracks during a recording operation, and a time residue and jitter in each track of said optical storage medium are absorbed by assigning a time, other than a time in which the track address and the data are recorded, to the track jump gap.

15. A method according to claim 9, wherein a reproducing operation is performed while a rotational speed of said optical storage medium is kept constant, and a reproduction clock frequency is variably changed, thereby performing a high-density recording operation with a constant recording wave length, and a high-speed recording operation with a constant rotational speed of said optical storage medium.

* * * * *